US012683393B2

(12) United States Patent
Jones

(10) Patent No.: US 12,683,393 B2
(45) Date of Patent: Jul. 14, 2026

(54) TRIPPING ENERGY LOADS DURING UNDER-FREQUENCY EVENTS BASED ON RATE OF CHANGE OF FREQUENCY

(71) Applicant: Xcel Energy Inc., Minneapolis, MN (US)

(72) Inventor: Kevin W. Jones, Minneapolis, MN (US)

(73) Assignee: Xcel Energy Inc., Minneapolis, MN (US)

( * ) Notice: Subject to any disclaimer, the term of this patent is extended or adjusted under 35 U.S.C. 154(b) by 419 days.

(21) Appl. No.: 18/297,741

(22) Filed: Apr. 10, 2023

(65) Prior Publication Data

US 2024/0339831 A1 Oct. 10, 2024

(51) Int. Cl.
| | |
|---|---|
| *H02J 3/001* | (2026.01) |
| *G05B 19/042* | (2006.01) |
| *H02J 3/38* | (2006.01) |

(52) U.S. Cl.
CPC ........ *H02J 3/00125* (2020.01); *G05B 19/042* (2013.01); *H02J 3/381* (2013.01); *G05B 2219/2639* (2013.01)

(58) Field of Classification Search
CPC .... H02J 3/00125; H02J 3/381; G05B 19/042; G05B 2219/2639
See application file for complete search history.

(56) References Cited

U.S. PATENT DOCUMENTS

| | | | |
|---|---|---|---|
| 6,864,595 | B2 | 3/2005 | Wall |
| 8,965,592 | B2 | 2/2015 | Manson |
| 9,906,037 | B2 | 2/2018 | Rogers |
| 10,439,433 | B2 | 10/2019 | Golshani et al. |
| 2007/0222294 | A1* | 9/2007 | Tsukida ................. H02H 3/033 |
| | | | 307/29 |

(Continued)

FOREIGN PATENT DOCUMENTS

| | | |
|---|---|---|
| WO | 2019/035760 | 2/2019 |

OTHER PUBLICATIONS

[No Author Listed], "Fast Frequency Response Concepts and Bulk Power System Reliability Needs," NERC, White Paper: Fast Frequency Response, Mar. 2020, 29 pages.

(Continued)

*Primary Examiner* — Michael W Choi

(74) *Attorney, Agent, or Firm* — Barnes & Thornburg LLP

(57) ABSTRACT

Disclosed are systems and methods for tripping energy loads in an energy transmission system based on rate of change of frequency (RoCoF). A method can include: receiving, by a control circuitry of a relay, energy-in-generation information for an energy load, determining a RoCOF for the energy load, identifying presence of first RoCoF conditions, setting first through nth timers based on a determination that at least a threshold of the first RoCoF conditions are identified, and until the first through nth timers expire: determining whether the threshold of the first RoCoF conditions is met before the first timer expires, generating instructions that cause tripping the energy load by a first predetermined amount based on a determination that the threshold of the first RoCoF conditions is met before the first timer expires, and returning the instructions for execution by the relay to cause the tripping of the energy load in near real-time.

21 Claims, 14 Drawing Sheets

(56)  References Cited

U.S. PATENT DOCUMENTS

| | | | | |
|---|---|---|---|---|
| 2010/0185336 A1* | 7/2010 | Rovnyak | .................. | H02J 3/38 |
| | | | | 700/287 |
| 2010/0244563 A1* | 9/2010 | Fleck | ...................... | H02H 3/46 |
| | | | | 307/35 |
| 2016/0245850 A1* | 8/2016 | Kasztenny | ............. | G01R 23/02 |
| 2018/0254662 A1* | 9/2018 | Golshani | ............... | G06Q 50/06 |
| 2020/0052487 A1* | 2/2020 | Trudel | ...................... | G05F 1/70 |
| 2021/0028623 A1* | 1/2021 | Rudez | ..................... | H02H 3/46 |

OTHER PUBLICATIONS

[No Author Listed], "Inertia and Rate of Change of Frequency (CoCoF)", Version 17, SPD—Inertia TF, Dec. 16, 2020, 48 pages.

Finney et al., "Testing of GE Universal Interconnection Device", NREL/TP-560-34676, Aug. 2003, 70 pages.

\* cited by examiner

| | | | Existing UFLS 400 | | | |
|---|---|---|---|---|---|---|
| Generation Tripped (MW's) | RoCoF (Hz/Sec.) | Total Load Shed (MW's) | Excess Amount of Load Shed (MW's) | Frequency Nadir (Hz) | Overshoot Freq. (Hz) | Final Freq. (Hz) |
| 95 | -0.54 | 200 | 105 | 59.23 | 61.23 | 60.92 |
| 140 | -1.01 | 200 | 60 | 59.14 | 60.84 | 60.60 |
| 190 | -1.24 | 200 | 10 | 59.10 | 60.21 | 60.13 |
| 235 | -1.71 | 400 | 165 | 58.96 | | 61.54 |
| 330 | -2.53 | 400 | 70 | 58.71 | 61.74 | 61.18 |
| 375 | -2.23 | 400 | 25 | 58.79 | 60.33 | 60.23 |
| 435 | -3.35 | 600 | 165 | 58.46 | | |
| 490 | -4.17 | 600 | 110 | 58.31 | 61.47 | 61.44 |
| 540 | -4.54 | 600 | 60 | 58.17 | 60.86 | 60.85 |
| 600 | -3.58 | 600 | 0 | 58.30 | 60.04 | 59.99 |
| 640 | -5.44 | 600 | -40 | 57.79 | N/A | |
| 700 | -4.05 | 600 | -100 | 56.95 | N/A | |
| 750 | -4.27 | 600 | -150 | 54.93 | N/A | |
| | | TOTAL | 770 | | | |
| | | Ave. Difference | 77.00 | | | |

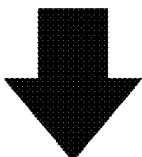

| | | | RoCoF UFLS 410 | | | |
|---|---|---|---|---|---|---|
| Generation Tripped (MW's) | RoCoF (Hz/Sec.) | Total Load Shed (MW's) * | Excess Amount of Load Shed (MW's) | Frequency Nadir (Hz) | Overshoot Freq. (Hz) | Final Freq. (Hz) |
| 95 | -0.54 | 100 | 5 | 59.27 | 60.17 | 60.10 |
| 140 | -1.01 | 155 | 15 | 59.20 | 60.48 | 60.17 |
| 190 | -1.24 | 205 | 15 | 59.06 | 60.23 | 60.14 |
| 235 | -1.71 | 285 | -30 | 59.08 | N/A | 59.72 |
| 330 | -2.53 | 345 | 15 | 58.94 | 60.67 | 60.20 |
| 375 | -2.23 | 405 | 30 | 58.81 | 60.38 | 60.27 |
| 435 | -3.35 | 425 | -10 | 58.97 | 60.44 | 59.91 |
| 490 | -4.17 | 475 | -15 | 58.99 | 60.03 | 60.02 |
| 540 | -4.54 | 545 | 5 | 58.86 | 60.50 | 60.25 |
| 600 | -3.58 | 625 | 25 | 58.75 | 60.42 | 60.11 |
| 640 | -5.44 | 645 | 5 | 58.59 | 60.50 | 60.22 |
| 700 | -4.05 | 795 | 95 | 58.54 | 60.85 | 60.56 |
| 750 | -4.27 | 825 | 75 | 58.39 | 60.69 | 60.44 |
| | | TOTAL | 55 | | | |
| | | Ave. Difference | 16.50 | | | |

FIG. 4A

Example Load Tripping Table 420

| Substation | Load Label | Load [MW(s)] | UFLS Level | AND_1 RoC of 3.5-10 Hz? | AND_2 RoC of 2.5-3.5 Hz? | AND_3 RoC of 1.5-2.5 Hz? | AND_4 RoC of 0-1.5 Hz? | Time Delay | Load Restore? |
|---|---|---|---|---|---|---|---|---|---|
| Birch | 1-1 | 50 | 3 | Y | Y | Y | Y | 6 | N |
| Birch | 1-2 | 25 | 1 | Y | Y | Y | Y | 6 | Y |
| Birch | 1-3 | 25 | 1 | Y | Y | Y | N | 12 | Y |
| Fir | 12-2 | 75 | 2 | N | N | N | N | 6 | N |
| Fir | 12-3 | 50 | 3 | Y | Y | Y | N | 30 | N |
| Maple | 2-1 | 75 | 3 | N | N | N | N | 30 | N |
| Maple | 2-2 | 75 | 3 | N | N | N | N | 30 | N |
| Maple | 2-3 | 50 | 2 | N | Y | Y | Y | 30 | N |
| Oak | 3-1 | 75 | 1 | Y | N | N | N | 6 | N |
| Oak | 3-2 | 75 | 2 | N | N | N | N | 15 | N |
| Oak | 3-3 | 50 | 1 | Y | Y | N | N | 5999999 | N |
| Pine | 7-1 | 25 | 1 | Y | N | N | N | 5999999 | N |
| Pine | 7-2 | 35 | 1 | Y | Y | Y | Y | 5999999 | N |
| Pine | 7-3 | 80 | 1 | Y | Y | Y | N | 20 | N |
| Pine | 10-1 | 150 | 1 | Y | N | N | N | 5999999 | N |
| TOTAL | | 1800 | | | | | | | |

| | | | | | | | | | |
|---|---|---|---|---|---|---|---|---|---|
| Level 1 Total | 475 | MW% | 26.79% | % | | | | | |
| Level 2 Total | 200 | MW% | 10.00% | % | | | | | |
| Level 3 Total | 200 | MW% | 100.00% | % | | | | | |

600

Receive substation frequency information
602

If first frequency threshold is met, then set first through nth timers
604

If the tripping frequency threshold is met before the first timer expires, then trip a first predetermined amount of the energy
606

If the tripping frequency threshold is met before the nth timer expires, then trip an nth predetermined amount of the energy
608

Did all timers expired?
610

No

More RoCoF conditions to identify presence of in the received information?
612

No

Yes

STOP

Yes

Identify presence of one or more nth RoCoF conditions
614

FIG. 6

TRIPPING ENERGY LOADS DURING UNDER-FREQUENCY EVENTS BASED ON RATE OF CHANGE OF FREQUENCY

TECHNICAL FIELD

This document generally describes systems, methods, and techniques related to more precisely controlling the tripping energy loads during under-frequency events, such as when high penetrations of renewable and other inverter-based resources may be present, to appropriately and quickly respond to an under-frequency event.

BACKGROUND

The current electrical grid includes multiple different types of energy sources that produce electricity and supply it to consumers connected to the grid. Energy sources for the electrical grid include synchronous energy resources which have inertia and inverter-based resources ("IBR") that have little to no inertia. For instance, synchronous energy resources generate power through the use of generators that have rotating masses spinning at a particular rate of revolution (e.g., 60 revolutions per second) to provide alternating current ("AC") at a corresponding and consistent frequency (e.g., 60 Hz). These synchronous energy resources can generate power through the use of a fuel, such as coal, oil, natural gas, and nuclear fuel. When the fuel is burned, water is heated in a boiler until it changes state to steam. The steam is passed through a turbine that turns the generator to produce electricity. The mass of the spinning turbine and coupled spinning generator provide inertia to the system. System inertia provided by rotating synchronous generators support a stable system frequency of ~60 Hz in the United States and Canada.

IBR energy generators, in contrast, include renewable energy sources such as wind turbines and solar power generators (e.g., solar panels). In contrast to synchronous energy resources, the prime mover of renewable generation is decoupled electrically from the transmission grid and is instead connected to the transmission grid by power electronics inverters. These power electronics inverters convert the movement of the wind turbine blades and the solar radiation absorbed by solar panels into AC power that is injected into the utility transmission system via the inverters. Since the AC current supplied to the utility transmission system is decoupled from the prime mover of the renewable resources, they provide little to no inertia to the transmission system.

Occasionally, a loss of generation suddenly occurs on the power grid, which creates an imbalance of load and generation. When there is not enough generation to supply connected load, generators slow down, and the system frequency starts to drop below 60 Hz. If system frequency drops below 59 Hz (3540 rpm), cumulative generator turbine blade damage can occur, so load must be tripped to rebalance load and generation. System frequency is normally 60 Hz if load and generation are balanced (equal). If a change in generation or load occurs, the frequency will rise for loss of load, or drop for loss of generation. When the frequency falls below 60 Hz, it can be termed an "under-frequency event" which can trigger efforts to rebalance the load and generation in the grid in order to achieve 60 Hz.

Conventional relays have been configured and implemented to ward against under-frequency events through the use of various levels of set points that, once the frequency hits or falls below, can cause varying loads to be tripped or shed from the system in an effort to rebalance the load. For example, these set points can include "Level 1" at 59.3 Hz, "Level 2" at 59.0 Hz, and "Level 3" at 58.7 Hz. As the frequency drops and reaches each of these levels, additional load is automatically shed by the relay in an effort to avoid significant and potentially extensive damage to the grid infrastructure, which could trigger broader blackouts and/or brownouts.

Blackouts can arise, often as accidents, when there is a fault in the energy load that causes an area to go into darkness. Large blackouts can be caused by a series of events called a cascade failure. A cascade failure can be initiated by a disturbance of energy flow in an energy (e.g., electrical) system. If, for example, a fault occurs in an energy transmission line and the line trips (e.g., is disconnected from other transmission lines), then the failure of the faulted line can put additional stress on other lines in the system and thus weaken the system as a whole. Faults in the energy transmission line can cause voltage and/or frequency swings across the system, which increases stresses on the system and may cause relays to trip other lines in the system. Voltage and/or frequency swings may be dangerous to generator equipment and can cause protection devices to shut down generation altogether. Once these types of failures occur one after another, they can cause a cascade failure, and thus a large blackout.

Brownouts, in comparison to blackouts, are reductions of energy power to an area. Brownouts can result in dimming of lights. Blackouts, on the other hand, result in loss of energy power to the area. Sometimes, brownouts can be performed deliberately by the utility provider to prevent blackouts, such as when there is an increase in power usage and/or when there is an overload on the system.

SUMMARY

The document generally describes systems, methods, devices, apparatus, and technology for more accurately and precisely tripping energy loads during under-frequency events based on rate of change of frequency ("RoCoF") to more accurately, consistently, quickly, and reliably achieve a balanced load-generation in the electrical grid (e.g., re-establishing 60 Hz in the electrical grid). For example, conventional relays relying on set points to shed differing loads can, in some instances, extend the load-generation imbalance by either shedding too much or too little load to adequately match the drop in generation, which can either extend the duration of the under-frequency event or can result in an over-frequency event in which the frequency overshoots the target value (e.g., 60 Hz). Both circumstances can be suboptimal, though, and can either lead to extended durations of under-frequency conditions when load is shed too slowly in response to the event or, can even lead to over-frequency conditions when too much load is shed too quickly, which results in a persisting frequency greater than 60 Hz. Both scenarios can be problematic and can potentially lead to broader problems throughout the grid. The disclosed innovation is directed to controllers and corresponding circuitry that is able to more appropriately respond to under-frequency events so that a sufficient amount of load is shed at appropriate timelines commensurate to the magnitude of the event, which can shorten the duration of under-frequency events and can avoid potentially dangerous over-frequency events from occurring.

For example, the inertia associated with synchronous power generators that rely on turbines to generate electrical power, such as coal and nuclear power generators, has historically provided for less fluctuation and greater consistency in the frequency of the provided electrical power. However, inverter-based energy sources, such as renewable energy sources like solar and wind, can have less associated inertia, which can lead to greater fluctuations in the frequency of electrical power that is supplied to the grid as these energy sources come online and/or go offline. As a result, higher penetrations of inverter-based energy sources within a grid (i.e., a greater proportion of inverter-based energy sources relative to synchronous energy sources) can result in greater susceptibility to significant frequency fluctuations, which may result in tripping too much or too little load during an energy system under-frequency events. As discussed above, tripping too much energy load can result in a severe over-frequency condition that may cause uncontrolled tripping of energy generation that results in cascade failure and system blackout.

The disclosed technology provides controllers and circuitry to protect and ward against under-frequency events, particularly when there is greater susceptibility to under-frequency events (e.g., greater proportion of inverter-based energy sources relative to synchronous sources). The disclosed technology is able to accomplish this by monitoring and using the RoCoF for the supplied power in combination with set points to identify under-frequency events and tripping appropriate amounts of load to combat the magnitude of the under-frequency event (i.e., more load for higher RoCoFs and less load for lower RoCoFs), which can be indicated by RoCoF information. By using RoCoF information in combination with set points, appropriate amounts of load can be tripped with minimal or no time delay relative to conventional circuitry relying on set points alone. In particular, the disclosed technology can employ microprocessor relay frequency elements, timer elements, and set/reset latch elements as part of a relay control circuitry to monitor RoCoF of supplied power and to trip loads in response to under-frequency events. The disclosed technology can be implemented, for example, in protective relays already deployed and used in energy transmission systems, such as part of an under-frequency load shed (UFLS) program to reduce or otherwise eliminate system blackouts.

The disclosed innovation can provide a proactive solution for monitoring and avoiding both under-frequency and over-frequency events in order to avoid system blackouts and/or brownouts.

One or more embodiments described herein can include a method for tripping energy loads in an energy transmission system based on rate of change of frequency (RoCoF), the method including: receiving, by a control circuitry of a relay, energy-in-generation information for an energy load, determining, by the control circuitry, a RoCOF for the energy load based on the received information, identifying, by the control circuitry, presence of one or more first RoCoF conditions, setting, by the control circuitry, first through nth timers based on a determination that at least a threshold of the one or more first RoCoF conditions are identified, and until the first through nth timers expire: determining, by the control circuitry, whether the threshold of the first RoCoF conditions is met before the first timer expires, generating, by the control circuitry, instructions that cause tripping the energy load by a first predetermined amount based on a determination that the threshold of the first RoCoF conditions is met before the first timer expires, and returning, by the control circuitry, the instructions for execution by the relay to cause the tripping of the energy load in near real-time.

In some implementations, the embodiments described herein can optionally include one or more of the following features. For example, the one or more first RoCoF conditions may include a first predetermined level frequency set point. The determination that at least the threshold of the one or more first RoCoF conditions are identified can be based on identifying a frequency of the energy load in the energy-in-generation information that may be within a threshold range of the one or more first RoCoF conditions, the one or more first RoCoF conditions can be a first predetermined level frequency set point. The first predetermined level frequency set point can be 59.8 Hz. The determination that at least the threshold of the one or more first RoCoF conditions can be identified may be based on identifying a RoCoF of the energy load in the energy-in-generation information that can be within a first threshold RoCoF range. The first threshold RoCoF range can be between 0 Hz/sec and 10 Hz/sec. Setting, by the control circuitry, first through nth timers can include setting 4 timers. The first predetermined amount can be 10% of the energy load.

As another example, the method can also include: generating, by the control circuitry, instructions that cause tripping the energy load by an nth predetermined amount based on a determination that the threshold of the first RoCoF conditions can be met before the nth timer expires. The method can also include determining, by the control circuitry, whether nth RoCoF conditions can be identified in the received energy-in-generation information, identifying, by the control circuitry, presence of one or more of the nth RoCoF conditions, and setting, by the control circuitry, the first through nth timers based on a determination that at least a threshold of the one or more nth RoCoF conditions may be identified. The nth RoCoF conditions can include a second predetermined level frequency set point. In some implementations, the second predetermined level frequency set point can be 59.3 Hz.

One or more embodiments described herein can include a relay apparatus for tripping energy loads in an energy transmission system based on rate of change of frequency (RoCoF), the relay apparatus including: a high-speed RoCoF under-frequency trip logic component that can be configured to generate instructions that cause tripping of an energy load in the energy transmission system without time delay, a supervised under-frequency trip logic component that can be configured to determine whether to execute the instructions that may be generated by the high-speed frequency RoCoF under-frequency trip logic component, a supervised automatic load restoration logic component that can be configured to determine whether to restore the energy load by a predetermined amount based on execution of the instructions that can be generated by the high-speed frequency RoCoF under-frequency trip logic component, and at least one transient filter that can be configured to avoid miss-tripping the energy load based at least in part on the instructions generated by the high-speed RoCoF under-frequency trip logic component.

The relay apparatus can optionally include one or more of the following features. The high-speed RoCoF under-frequency trip logic component can be configured to: set at least one timer based on determining that a system frequency of the energy load equals a predetermined level frequency set point, and in response to setting at least one timer, generating the instructions that cause the tripping of the energy load based on a RoCoF of the energy load satisfying one or more tripping conditions. The predetermined level frequency set point can be 59.8 Hz. The high-speed RoCoF under-frequency trip logic component can be configured to generate instructions that cause the tripping of the energy load based on determining that a RoCoF of the energy load may be between 0 Hz/sec and 6 Hz/sec. The high-speed RoCoF under-frequency trip logic component can be configured to generate instructions that cause the tripping of the energy load by 10% based on determining that the RoCoF of the energy load may be less than 1.5 Hz/sec. As another example, the high-speed RoCoF under-frequency trip logic component can be configured to generate instructions that cause the tripping of the energy load by 15% based on determining that the RoCoF of the energy load may be less than 2.5 Hz/sec.

As another example, the high-speed RoCoF under-frequency trip logic component can be configured to generate instructions that cause the tripping of the energy load by 20% based on determining that the RoCoF of the energy load is less than 3.75 Hz/sec. The high-speed RoCoF under-frequency trip logic component can be configured to generate instructions that cause the tripping of the energy load by 25% based on determining that the RoCoF of the energy load is less than 6 Hz/sec. The supervised automatic load restoration logic component can be configured to determine to restore the energy load by the predetermined amount based on determining that a RoCoF of the energy load is greater than 0.2 Hz/sec.

In some implementations, the at least one transient filter can include a fast transient filter that can be configured to avoid mis-tripping in response to a loss of an energy source to a substation in the energy transmission system. The fast transient filter can also be configured to: identify that a frequency of the energy load can be less than a settable frequency element, set a timer based on the identification, and identify that the frequency drops to a second settable frequency element while the timer is set, set a flip-flop state of the relay apparatus based on identifying that the frequency drops to the second settable frequency element while the timer is set, and generate instructions to prevent under-frequency tripping of the energy load. Sometimes, the fast transient filter can be configured to detect RoCoF that is greater than 12 Hz/sec. The at least one transient filter can include a slow transient filter that can be configured to prevent high-speed RoCoF under-frequency logic from tripping in response to frequency anomalies of one or more energy resources, the slow transient filter being configured to: identify that the frequency of the energy load is less than the settable frequency element, set a second timer based on the identification, and identify that the frequency drops to a third settable frequency element while the second timer is set, set the flip-flop state of the relay apparatus based on identifying that the frequency drops to the third settable frequency element while the second timer is set, and generate instructions to prevent high-speed RoCoF under-frequency tripping of the energy load. The one or more energy resources can include wind turbines and solar panels. The slow transient filter can be configured to detect RoCoF that is greater than 6 Hz/sec.

As another example, the relay apparatus can also include a relay under-frequency logic component including a settable frequency element and a timer, the settable frequency element being set to a predetermined tripping frequency corresponding to the energy transmission system. The relay under-frequency logic component can be configured to: identify that a frequency of the energy load can be less than or equal to the settable frequency element, set the timer based on the identification, determine whether the frequency remains less than or equal to the settable frequency element for a duration of the timer, and generate instructions to trip the energy load by a predetermined amount based on the determination. In some implementations, the relay apparatus can also include a relay under-voltage inhibit logic component that can be configured to prevent under-frequency tripping events as a result of loss of an energy source to a substation in the energy transmission system, the relay under-voltage inhibit logic component being configured to: identify that a frequency of the energy load may be less than a predetermined under-voltage pick-up value, and generate instructions to prevent under-frequency tripping of the energy load based on the identification.

The devices, controllers, circuitry, apparatus, systems, and techniques described herein may provide one or more of the following advantages. For example, the disclosed technology can reduce, mitigate, or otherwise eliminate likelihood of system-wide blackouts or brownouts from occurring. This can be achieved by monitoring RoCoF and tripping appropriate energy loads to avoid extended under-frequency events and over-frequency events. RoCoF can be used in combination with threshold set points, such as Level 1 (59.3 Hz), Level 2 (59.0 Hz) and Level 3 (58.7 Hz), to shed appropriate amounts of load to more quickly resume 60 Hz (or other target frequency levels), avoiding overshooting or undershooting energy load tripping to maintain the grid frequency at a desired frequency, such as 60 Hz.

As another example, the disclosed technology can be implemented in existing transmission systems at a low cost. Similarly, the disclosed technology can save costs regarding avoided or postponed investment costs in synchronous condensers and/or battery energy storage systems (BESS) to accomplish same or similar objectives. Furthermore, the disclosed technology provides for reducing and/or eliminating an extent and severity of blackouts, which further can eliminate lost electric revenue, reduce possibility of lawsuits, reduce possibility of NERC Reliability Standard fines and/or penalties, and reduce potential negative publicity.

The details of one or more implementations are set forth in the accompanying drawings and the description below. Other features and advantages will be apparent from the description and drawings, and from the claims.

BRIEF DESCRIPTION OF THE DRAWINGS

FIG. 4A illustrates example test data results for tripping energy loads with and without a RoCoF under-frequency tripping scheme.

FIG. 4B illustrates example data of energy loads to be tripped with a RoCoF under-frequency tripping scheme.

FIGS. 5A-E are example alternative embodiments of a RoCoF control circuitry of a relay.

FIG. 6 is a flowchart of a process for energy load tripping using a RoCoF under-frequency tripping scheme.

Like reference symbols in the various drawings indicate like elements.

DETAILED DESCRIPTION OF ILLUSTRATIVE EMBODIMENTS

This document generally relates to technology to permit relays and other components to quickly, efficiently, and proportionally respond to under-frequency events based on RoCoF for the supplied energy. In particular, the disclosed technology can use RoCoF to shed appropriate energy loads on energy transmission systems in response to under-frequency events in a manner that avoids tripping too much or too little load. An under-frequency event can occur when a significant amount of energy generation is lost, which depending on the proportion of synchronous and inverter-based energy sources supplying the energy, can cause variation in the RoCoF during under-frequency events. When frequency decays quickly, more load than desired may trip. If too much energy load is tripped, then the predetermined frequency may be overshot (e.g., exceeds 60 Hz), which can cause additional energy load generation tripping and potential blackouts. The disclosed technology allows for the monitoring of the rate of change of frequency of energy loads against one or more under-frequency level set points (e.g., thresholds) in order to reduce (e.g., trip) loads along some energy transmission lines to avoid system-wide or large blackouts or brownouts. More load can be tripped at certain under-frequency level set points versus others to avoid massive changes in frequency that can impact other energy loads and transmission lines across the system. For example, an electrical energy grid generates and consumes electricity. Some renewable energy resources may not be controllable, which can cause mismatches or inconsistencies in energy production and consumption on the grid. The RoCoF of these energy loads can be assessed at relays in the system to determine whether the RoCoF crosses various threshold level set points and if so, how much of the energy loads to trip.

Figure 1A:
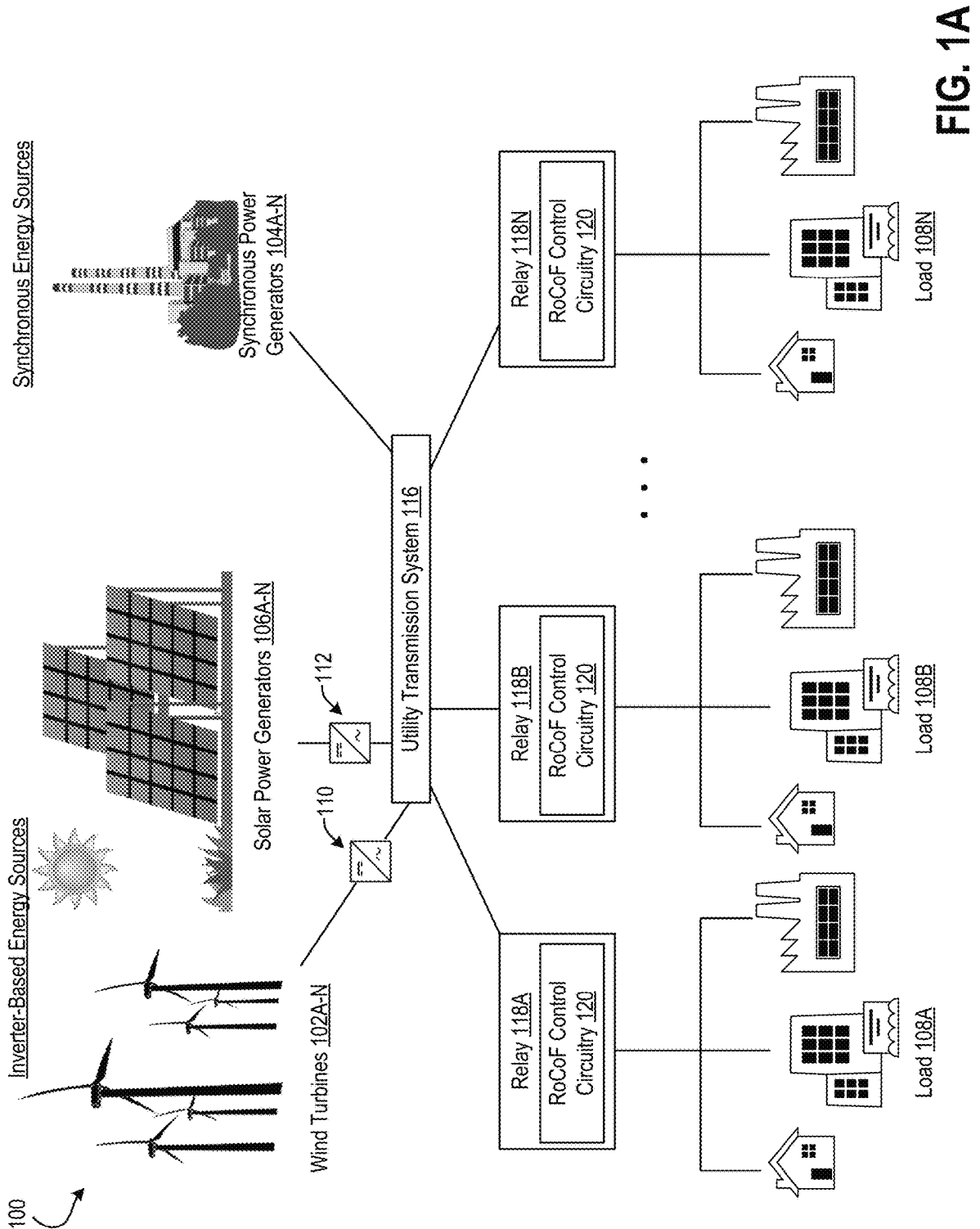
FIGS. 1A-B are conceptual diagrams of a system for generating and consuming energy using a RoCoF under-frequency tripping scheme.
Figure 1B:
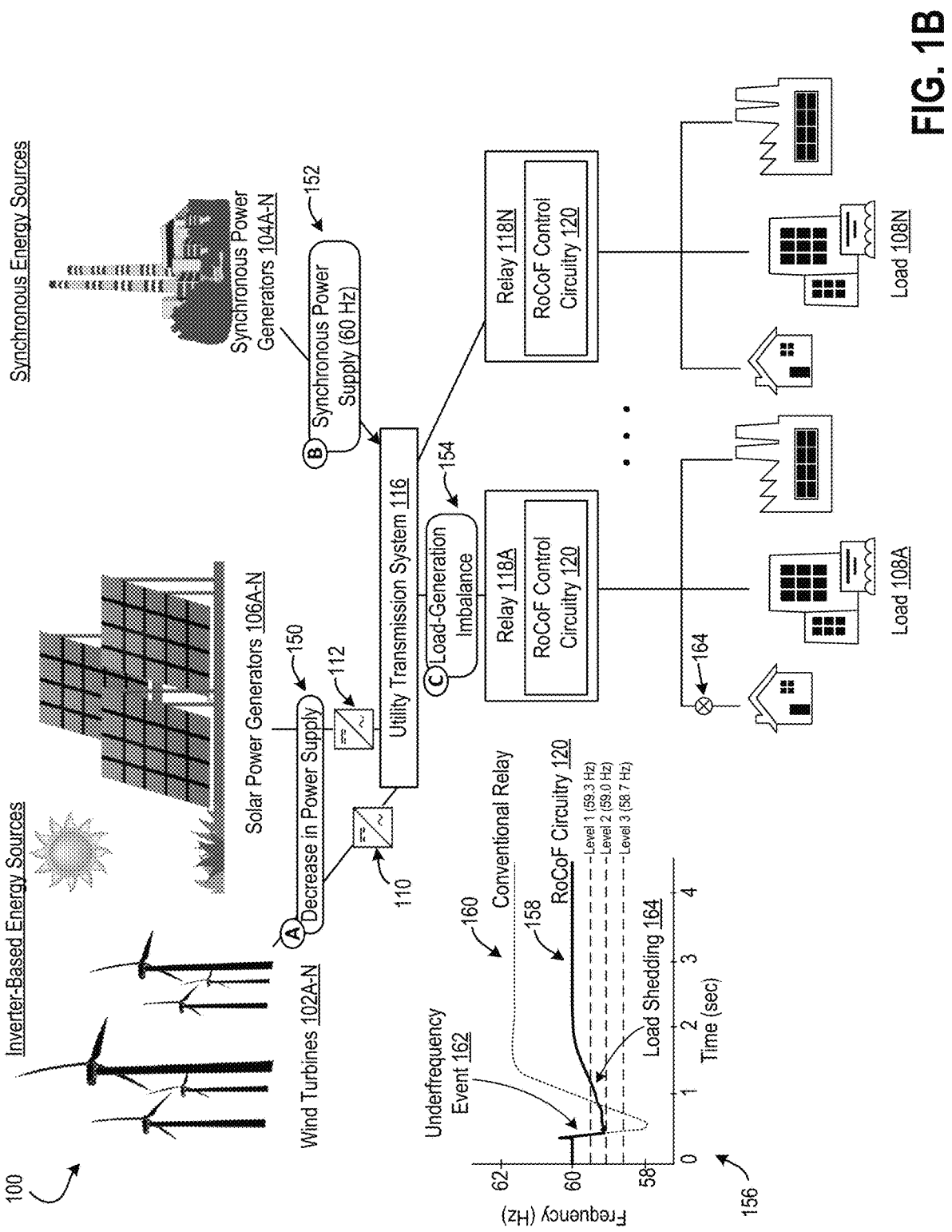

Referring to the figures, FIGS. 1A-B are conceptual diagrams of a system 100 for generating and consuming energy using a RoCoF under-frequency tripping scheme. Referring to FIG. 1A, various types of power or energy resources can provide energy to be consumed. Such energy resources can include inverter-based energy sources, such as wind turbines 102A-N and solar farms 106A-N, and synchronous energy sources, such as power plants 104A-N (e.g., coal, electric, hydroelectric, etc.). The energy resources 102A-N, 104A-N, and/or 106A-N can generate energy to be provided via a utility transmission system 116 to various energy consumers, such as residential, commercial, and industrial energy consumers, which are represented as loads 108A-N. The energy can be routed to the different energy consumers from the utility transmission system 116 via relays 118A-N, each of which can have respective rate of change of frequency (RoCoF) control circuitry 120. Each of the relays 118A-N can be configured to service different loads 108A-N (e.g., buildings, homes, residential structures, stores, restaurants, and other energy consumers). The relays 118A-N can each be, for example, a junction box where electricity goes and gets routed to various different places, regions, consumers, and/or other transmission lines. The RoCoF control circuitry 120 of each of the relays 118A-N can provide for the respective relay to better modulate it's electricity to then control blackouts in the relay's domain/region, thereby avoiding major blackouts across various domains in the system 100.

Therefore, the relays 118A-N can, using the RoCoF control circuitry 120, engage tripping schemes to counteract energy spikes that may arise from variability in certain types of energy resources, such as wind and solar. For example, energy production from the wind turbines 102A-N and the solar farms 106A-N may spike (e.g., during windy days, during sunny days), which can rely on corresponding DC-to-AC inverters 110 and 112 to supply electrical current at a target frequency (e.g., 60 Hz), can have little-to-no inertial energy in comparison to turbine-based synchronous power generators 104A-N, and thus may not be a constant energy source, whereas energy from the synchronous power generators 104A-N can have corresponding inertial energy that can provide electricity at more constant and/or predictable frequency. The disclosed technology can be used to counteract under-frequency events, particularly in situations where there is a greater proportion of inverter-based energy sources introducing greater potential variability the frequency of the supplied power. The system 100 can be used to avoid causing blackouts or brownouts across the entire system 100 or large areas of the system 100 by automatically engaging tripping schemes at one or more of the relays 118A-N through the use of the RoCoF control circuitry 120.

Additionally variation can be introduced into the system as distributed inverter-based energy sources are introduced throughout the grid, as well, such as through residential and commercial solar panels that can be associated with loads 108A-N. For example, one or more homes can have solar panels that generate solar energy. As another example, one or more farms can have wind turbines that generate wind energy.

As an illustrative example of the disclosed techniques, significant amounts of renewable energy generation, such as wind and/or solar generation, may be continuously added to the energy system 100. A prime mover of renewable generation can be decoupled electrically from a transmission grid, such as the utility transmission system 116. The prime mover can be connected to the transmission grid by power electronics inverters. These power electronics inverters can convert movement of wind turbine blades and solar radiation absorbed by solar panels into alternating current (e.g., AC) that can then be injected into the utility transmission system 116 via the inverters. Since the AC current supplied to the system 116 is decoupled from the prime mover of the renewable resources, they provide little to no inertia to the system 116. Inertia in the system 116 can be provided by a rotating mass of conventional synchronous generators spinning at 3,600 revolutions per minute (rpm), or 60 revolutions per second (e.g., 60 Hz). These generators typically can be powered by coal, oil, natural gas, or nuclear fuel. When this fuel is burned, water can be heated in a boiler until it changes state to steam. The steam can then pass through a turbine that turns the generators to produce electricity. The mass of the spinning turbine and coupled spinning generator provide inertia to the system 116. System inertia provided by rotating synchronous generators can support a stable system frequency of approximately 60 Hz (or another predetermined frequency for the particular system). Occasionally, a loss of generation suddenly may occur on the grid, which can create an imbalance of energy load and generation. When there is not enough generation to supply connected load, generators slow down, and the system frequency can drop below 60 Hz. If the system frequency drops below 59 Hz (e.g., 3,540 rpm), cumulative generator turbine blade damage can occur. To rebalance load and generation in such a scenario, energy load can be tripped.

The system frequency can typically be 60 Hz if energy load and generation are balanced (e.g., equal). If a change in energy load or generation occurs, the frequency may rise for loss of load, or drop for loss of generation. The equations below show the relationship of deviation from normal frequency for a change in load (negative DL) or generation (positive DL):

$$f = f_{sys} - \Delta L \cdot \left(1 - e^{-\frac{t}{T}}\right) \cdot K \cdot 60 \tag{1}$$

$$T = \frac{M}{D}$$

$$K = \frac{1}{D}$$

where:

$f_{prs}$ is the base systems frequency (60 Hz).

$\Delta L$ is the change in lead in per unit.

t is time in seconds.

M is the inertia constant of the system, which equals 2H.

D is the load-damping constant.

60 is the constant to put the values in Hz.

Rewriting the equation and substituting values for T and K yields (2).

$$f = f_{sys} - \Delta L \cdot \left(1 - e^{-\frac{D \cdot t}{2 \cdot H}}\right) \cdot \frac{1}{D} \cdot 60 \tag{2}$$

Taking the first derivative of (2) yields (4) to calculate the ROCOF at any point in time.

$$\frac{df}{dt} = \frac{-30 \cdot \Delta L}{H} \cdot e^{-\frac{D \cdot t}{2 \cdot H}} \tag{4}$$

Solving the first derivative at t=0 yields (5) and results in the fastest ROCOF.

$$\frac{df}{dt} = \frac{-30 \cdot \Delta L}{H} \tag{5}$$

As shown in equations 4 and 5 above, the RoCoF may be directly proportional to the change in load and/or generation, and inversely proportional to inertia. As inertia decreases, the RoCoF increases, for example. Furthermore, more renewable energy generation and less system inertia can result in deeper frequency excursions and excessively high final frequencies, which can lead to system-wide blackouts. Therefore, the disclosed techniques can be used to avoid such system-wide blackouts, by tripping loads by predetermined amounts based on assessment of RoCoF.

Referring to FIG. 1B, an illustrative example is given of an under-frequency event being introduced into the system 100 and the RoCoF control circuitry 120 being used to quickly and efficiently shed appropriate amounts of load to respond to the event. In the illustrative example, there is a decrease in power supplied by the inverter-based energy sources 102A-N and/or 106A-N (step A, 150). At the same time, the synchronous power supply, which has inertial mass that aids in maintaining a more consistent frequency, can supply energy at a target frequency (step B, 152). The greater the proportion of inverter-based energy that is supplied relative to the synchronous power supply and the greater the drop in inverter-based energy can cause a more significant load-generation imbalance, which can cause an under-frequency event to occur (step C, 154). As an illustrative example, a graph 156 is shown that depicts the occurrence of an example under-frequency event 162 occurring. A line 160 is shown for an example set point driven-response that is undertaken by a conventional relay (i.e., set points at Levels 1-3) and another line 154 is plotted for an example RoCoF circuit 120 that additionally leverages RoCoF in order shed loads. In the illustrative example, the RoCoF control circuit 120 is able to more quickly shed an appropriate load 164 based on the rate of change of the frequency drop in combination with the set points in order to better and more quickly regain the desired frequency of 60 Hz. In contrast, in the line 160 for a conventional relay, not enough load is initially shed at Level 1 or Level 2 to stop the fast drop in frequency, but because load is shed at predetermined levels quickly through Level 1, 2, and 3 set points the sudden and significant reduction in the load ends up being too much, which creates an over-frequency event. The disclosed innovation embodied in the RoCoF control circuitry 120 described throughout this document is able to avoid such over-frequency events.

Figure 2:
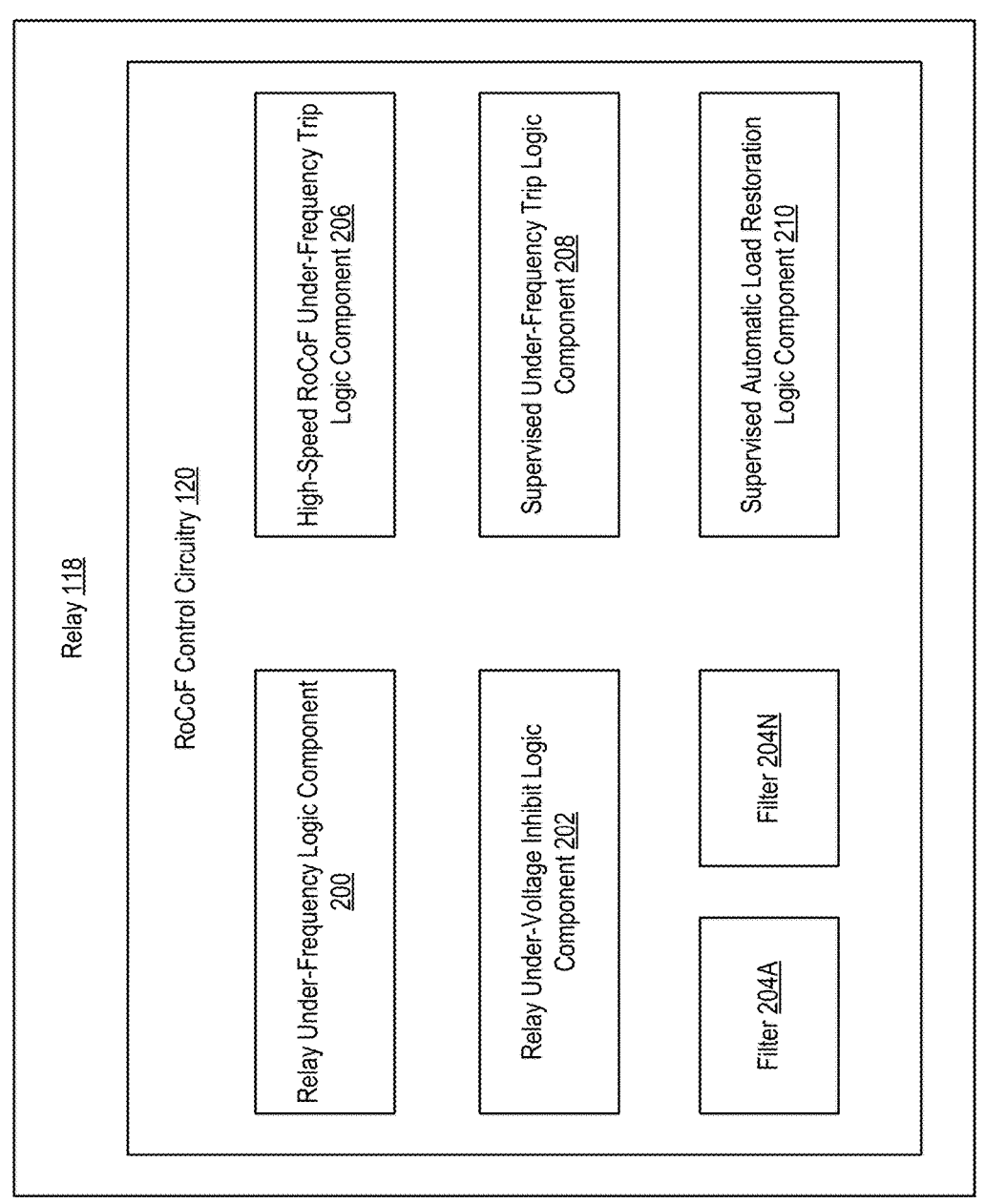
FIG. 2 is a conceptual block diagram of a RoCoF control circuitry of a relay for performing the disclosed techniques.
Figure 3:
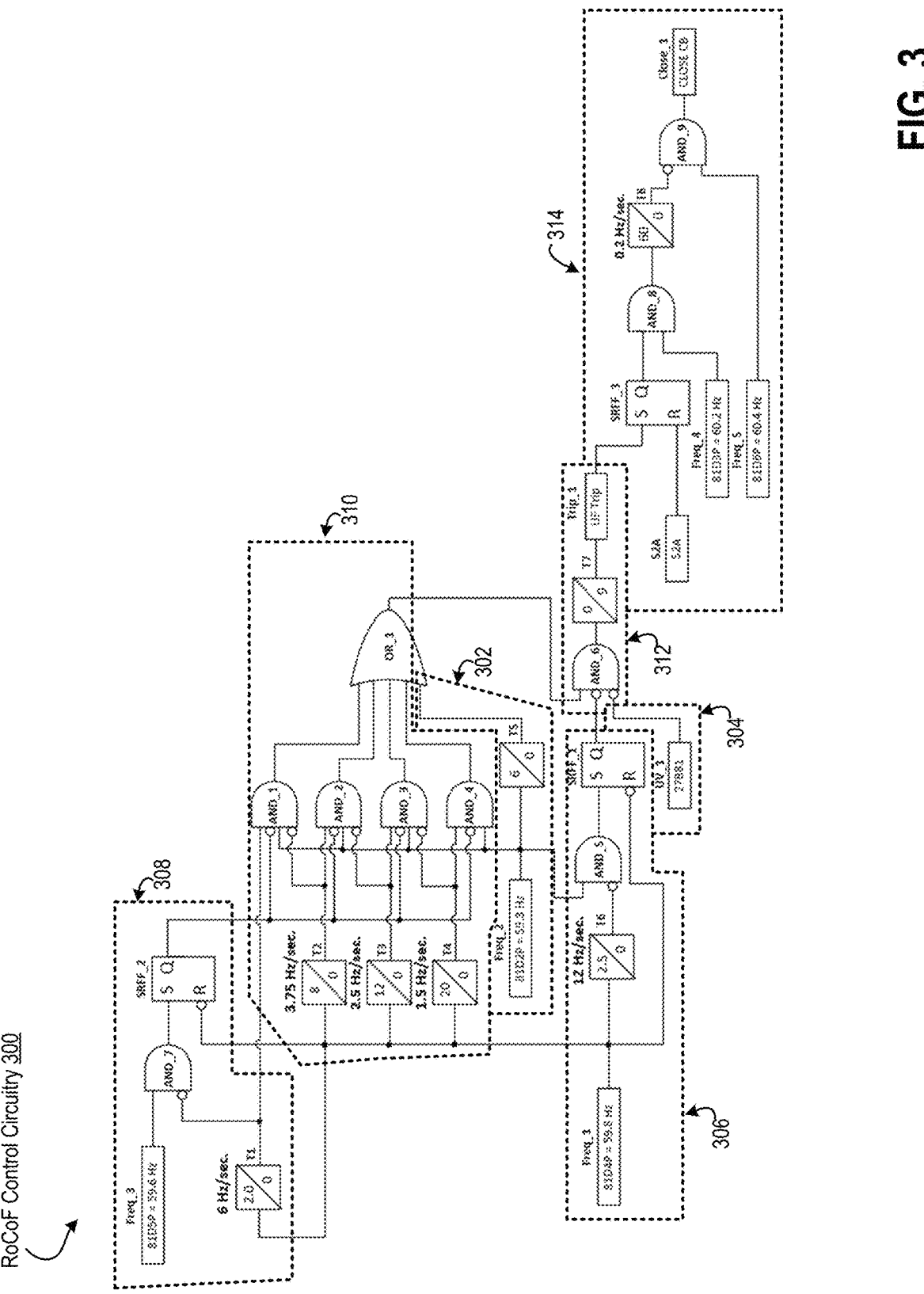
FIG. 3 is an illustrative example of a RoCoF control circuitry of a relay for performing the disclosed techniques.

FIG. 2 is a conceptual block diagram of a RoCoF control circuitry 120 of a relay 118 for performing the disclosed techniques. The circuitry can include filters 204A-N, a high-speed RoCoF under-frequency trip logic component 206, a supervised under-frequency trip logic component 208, and/or a supervised automatic load restoration logic component 210. In some implementations, the circuitry 120 may not include all the components 204-210. In some implementations, the circuitry 120 can include a relay under-frequency logic component 200 and/or a relay under-voltage inhibit logic component 202. Sometimes, the components 200 and/or 202 may already be built into or otherwise integrated into existing circuitry 120. The components 204-210 can then be added or retrofitted to the existing circuitry 120 of the relay 118. Refer to FIG. 3 for further discussion about each of the components 200-210.

Information can be transmitted into and out of the circuitry 120 and the relay 118 more generally. For example, frequency signals can be transmitted to the circuitry 120 as described in reference to FIG. 1B. The frequency signals can be processed by one or more of the components 200-210 and then the circuitry 120 can determine one or more controls based on this frequency processing. The controls can be transmitted out of the relay 118, and can include, for example, tripping/closing breakers in response to identifying under- and/or over-frequency events using the components 200-210.

FIG. 3 is an illustrative example of a RoCoF control circuitry 300 of a relay for performing the disclosed techniques. The illustrative RoCoF control circuitry 300 can include 7 logic components, each serving different purposes for execution of the RoCoF under-frequency tripping scheme described herein. One or more of these logic components are also represented by the components 200-210 in the circuitry 120 of FIG. 2. The circuitry 300 can be implemented in any one or more of the relays 118A-N described herein (e.g., refer to FIGS. 1A-B). Sometimes, as shown in FIGS. 5A-E, one or more of the logic components may not be used for every relay and/or every energy transmission system. In some implementations, the logic shown in FIG. 3 can be implemented using conventional microprocessor relays having custom control logic programming capabilities. The components of the circuitry 300 can include a relay under-frequency logic element 302, a relay under-voltage inhibit logic element 304, a fast transient filter 306, a slow transient filter 308, a high-speed RoCoF under-frequency trip logic element 310, a supervised under-frequency trip logic element 312, and a supervised automatic load restoration logic element 314.

The relay under-frequency logic element 302 can be any conventional microprocessor relay over/under frequency logic element. This logic can be part of a built-in function of these relays for under-frequency protection. The logic element 302 can be comprised of a settable frequency element (Freq_2) and a timer (T5). Frequency element Freq_2 can be set to one or more tripping frequencies for a particular region being serviced by the relay(s). For example, Freq_2 can be set to 1 of 3 tripping frequencies for a particular, predetermined geographic region (e.g., 59.3 Hz, 59.0 Hz, 58.7 Hz). For this example in FIG. 3, the Freq_2 is set to 59.3 Hz. If monitored frequency is less than or equal to Freq_2, the timer T5 is automatically started. Timer T5 can typically be set to 6 cycles (e.g., %o=0.1 second). The timer T5 can also be set to one or more other values that comply with the Planning Coordinator's (PC) NERC PRC-006 Standard (e.g., less than or equal to 30 cycles) or other regulations and standards. If the monitored frequency remains below 59.3 Hz for the duration of timer T5, OR gate OR_1 asserts, asserting 1 of the 3 inputs to AND gate AND_6. This logic element 302 can be considered part of the overall logic of the circuitry 300, but can be disabled by removing its trip input to OR_1.

The relay under-voltage inhibit logic element 304 can be SEL-351S and SEL-451 under-voltage inhibit logic. This logic element 304 can be a built-in function of such relays. The under-voltage inhibit logic element 304 can be designed to ensure that under-frequency tripping cannot occur unless a bus voltage is healthy. This can prevent under-frequency tripping for loss of source to a substation. Normally, under-voltage element UV_1 may not be asserted (logical 0), and the NOT bubble on AND_6 asserts, resulting in a logical 1 of that input to AND_6. If the monitored voltage drops below the UV_1 pick-up value (e.g., 67% of nominal voltage, or some other percentage that complies with PC's NERC PRC-006 Standard or other regulations and standards), a logical 1 output of UV_1 results in a logical 0 to AND_6, which turns off AND_6, thereby preventing under-frequency tripping. The relay under-voltage inhibit logic element 304 can be part of the overall logic of the relays described herein.

The fast transient filter 306 can be configured to provide a level of security to avoid mis-tripping on loss of source (similar to UV_1). If loss of transmission source occurs at a substation with under-frequency relaying and loads that are mostly induction motors, the motor load can hold the voltage above the UV_1 setting and an under-frequency mis-trip can occur. This filter 306 also can provide transient protection from frequency anomalies that may occur due to transmission faults around wind and/or solar farms. The fast transient filter 306 can detect a frequency drop at approximately 59.8 Hz (Freq_1). The filter 306 can also start adjustable timer T6 and remove the reset state to flip-flop SRFF_1. Freq_1 can be adjustable. In some implementations, Freq_1 may not be set higher than 59.8 Hz. Freq_1 can be adjusted to 0.5 Hz higher than Freq_2, in some implementations. In some implementations, Freq_1 can be adjusted according to one or more threshold levels or ranges relative Freq_2. If the frequency drops to Freq_2 before timer T6 times out, for example, AND_5 inputs assert and set flip-flop SRFF_1, which in turn can turn off AND_6, thereby preventing under-frequency tripping. This fast transient filter 306 can detect RoCoF above 12 Hz/second [(59.8–59.3)/(2.5/60)=12 Hz/second], or some other threshold RoCof value. Timer T6 can be adjusted to a different value to change the RoCoF if necessary. In some illustrative examples, Timer T6 may be set to 2 or more cycles. If a true under-frequency event is experienced, RoCoF will generally be less than 6 Hz/second. For a true under-frequency event, timer T6 can time out before Freq_2 is reached and AND_5 will be blocked, which can allow the middle input to AND_6 to remain asserted due to no output from flip-flop SRFF_1. When the frequency recovers to above 59.8 Hz, or another predetermined value, flip-flop SRFF_1 can be reset. The fast transient filter 306 can be part of the main circuitry of the relays described herein.

The slow transient filter 308 can provide another level of security to prevent high-speed RoCoF under-frequency logic from mis-tripping due to slow evolving frequency anomalies near wind and/or solar farms. The slow transient filter 308 can be configured to detect a frequency drop at approximately 59.8 Hz (Freq_1), or another predetermined threshold value or range, then starts an adjustable timer T1 and removes the reset state to flip-flop SRFF_2. Freq_3 can be adjusted to be approximately 0.2 Hz lower than Freq_1. Freq_3 can also be adjusted by approximately one or more other predetermined amounts, values, and/or thresholds. Timer T1 can be adjusted to a different value to change the RoCoF if necessary. For example, the Timer T1 can be adjusted to one or more other values that are at least 2 cycles. If the frequency drops to Freq_3 before timer T1 times out, then AND_7 inputs assert and set flip-flop SRFF_2, which in turn turns off AND gates AND_1, AND_2, AND_3 and AND_4, preventing high-speed RoCoF under-frequency tripping. This slow transient filter 308 can detect RoCoF above 6 Hz/second [(59.8-59.6)/(2.0/60)=6 Hz/second], or another predetermined value, threshold, and/or range. If a true under-frequency event occurs, RoCoF can generally be less than 6 Hz/second. For a true under-frequency event, timer T1 can time out before Freq_3 is reached and AND_7 will be blocked, allowing the second inputs to AND_1, AND_2, AND_3 and AND_4 to remain asserted due to no output from flip-flop SRFF_2. When the frequency recovers to above 59.8 Hz, flip-flop SRFF_2 can be reset. The slow transient filter 308 can be optionally incorporated into the circuitry of the relays described herein.

The high-speed RoCoF under-frequency trip logic element 310 can be configured to trip with no intentional time delay if the RoCoF is between 0-6 Hz/second, or some other predetermined threshold range, level, and/or value. In some implementations, the element 310 can include all 4 AND gates shown in FIG. 3. Sometimes, any other combination of the AND gates can be used in the element 310. For example, only the first 3 (AND_1, AND_2, AND_3: RoCoF between 1.5-6 Hz) may be used, only the first 2 (AND_1, AND_2: RoCoF between 2.5-6 Hz) may be used, only the first 1 (AND_1: RoCoF between 3.75-6 Hz) may be used, or none may be used (conventional under-frequency tripping elements may be used instead). This selectivity allows tripping of more load when high RoCoF is experienced.

As an illustrative example, for level 1 under-frequency tripping (59.3 Hz), if the RoCoF is less than 1.5 Hz/second, only 10% of system load will be tripped. This can be accomplished by arming 10% of level 1 under-frequency relays to trip with all four AND gates. When the RoCoF is less than 2.5 Hz/second, 15% of system load will be tripped, in another example. This can be accomplished by arming an additional 5% of load to trip with AND_1. AND_2, and AND_3. When the RoCoF is less than 3.75 Hz/second, 20% of system load can be tripped. This can be accomplished by arming an additional 5% of load to trip with AND_1 and AND_2. When the RoCoF is less than 6 Hz/sec, 25% of system load can be tripped. This can be accomplished by arming an additional 5% of load to trip with AND_1. More simply, AND_1 can trip 25%, AND_2 can trip 20%, AND_3 can trip 15%, and AND_4 can trip 10% of level 1 load. This staggered tripping of more and more load for increasing levels of RoCoF may allow tripping of a right amount of load during simulations, producing more stable frequency recovery as a whole.

When system frequency reaches 59.8 Hz (Freq_1) for an under-frequency event, for example, timers T1, T2, T3 and T4 can assert simultaneously. If the RoCoF is less than 6 Hz/sec, timer T1 can time out, asserting the top input to AND_1. Since the RoCoF is less than 6 Hz/second, SRFF_2 may not assert, which maintains the second input assertion to AND_1. AND_2, AND_3 and AND_4. If the frequency reaches the setpoint for Freq_2 before timer T2 times out (RoCoF between 3.75-6 Hz/second), all four inputs to AND_1 can be asserted, which asserts OR_1, which further asserts the top input to AND_6. If, as another example, timer T2 times out before Freq_2 is reached, AND_1 can be de-asserted and the top input to AND_2 can be asserted. If the frequency reaches the setpoint for Freq_2 before timer T3 times out (RoCoF between 2.5-3.75 Hz/second), all four inputs to AND_2 can be asserted, which asserts OR_1, which further asserts the top input to AND_6. If timer T3 times out before Freq_2 is reached, AND_2 can be de-asserted and the top input to AND_3 can be asserted. If the frequency reaches the setpoint for Freq_2 before timer T4 times out (RoCoF between 1.5-2.5 Hz/second), all four inputs to AND_3 can be asserted, which asserts OR_1, which also asserts the top input to AND_6. If, as another example, timer T4 times out before Freq_2 is reached, AND_3 can be de-asserted and the top input to AND_4 can be asserted. When the frequency reaches the setpoint for Freq_2 (RoCoF between 0-1.5 Hz/second), all three inputs to AND_4 can be asserted, which can assert OR_1, which further can assert the top input to AND_6.

The supervised under-frequency trip logic element 312 can combine logic of one or more of the abovementioned logic elements 302-310 into an under-frequency trip decision if all supervising elements allow for a trip. If any of the inputs to OR_1 assert, and if SRFF_1 is not asserted and if UV_1 is not asserted, AND_6 can assert timer T7, which can also issue an under-frequency trip (Trip_1). Timer T7 can maintain assertion of Trip_1 with its 9-cycle dropout timer (or dropout time having another predetermined cycle).

The supervised automatic load restoration logic element 314 is an optional logical element that can be implemented in systems where frequency overshoot can be greater than 60.5 Hz (or some other predetermined threshold frequency). Typically, load from level 1 (59.3 Hz) can be restored in such scenarios. Total load restoration can be typically up to 5% of system load in multiple load blocks with typically no more than 2% of system load being restored in a single block. Load restoration can only occur if the RoCoF is above 0.2 Hz/second (this can be a preliminary value to be determined by system, which can also be subject to approval by Planning Coordinator standards or other regulations and standards). The automatic load restoration logic of the logic element 314 can be asserted by under-frequency trip (Trip_1).

Trip_1 can set SR flip-flop SRFF_3 once the circuit breaker has opened its contacts (52A becomes logical 0), removing the reset condition to SRFF_3. The assertion of SRFF_3 can be held for 9-cycles by the dropout timer of timer T7. The breaker 52A can remain open (logical 0) within 3-5 cycles, giving at least a 4-cycle margin. SRFF_3 can assert the top input to AND_8 and can be held until the breaker closes and 52A resets SRFF_3. The bottom input to AND_8 asserts when the frequency overshoots to 60.2 Hz, asserting Freq_4. When AND_8 asserts, adjustable timer T8 can also be started simultaneously. If the frequency reaches 60.4 Hz before timer T8 times out, Freq_5 asserts, asserting Close_1, which can close the circuit breaker, thereby restoring load. About 3-5 cycles after Close_1 asserts, 52A can assert, thereby resetting SR flip-flop SRFF_3. If timer T8 times out before Freq_5 asserts, AND_9 can be reset and no load restoration may occur. Timer T8 can be adjusted to a different value to change the RoCoF if necessary, such as a predetermined threshold quantity of cycles, such as any amount of cycles that is greater than 2 cycles.

FIG. 4A illustrates example data for tripping energy loads with and without an RoCoF under-frequency tripping scheme. Table 400 displays example data for tripping energy loads without the RoCoF under-frequency tripping scheme. Table 410 displays example data for tripping energy loads with the RoCoF under-frequency tripping scheme described herein.

For systems with high penetrations of wind and/or solar, which results in reduced system inertia, RoCoF can be much higher than normal. High RoCoF can result in too much load being tripped for system under-frequency events, resulting in excessively high frequency, that can also lead to a system-wide blackout. A 67% reduced inertia test system caused by replacement of synchronous generation with type IV wind generation can highlight this effect. Test system study results, as shown in the example table 400, can be a scaled-down system that represents an existing energy transmission system. As can be shown in the table 400, 5/13 (38%) of cases indicate that frequency is too high in 2 cases and too low in 3 cases to avoid system-wide blackout (which are shown in darkened boxes in the table 400). Average excess amount of load shed is 77 MW's in the example of the table 400.

As shown in the table 410, where the described RoCoF under-frequency tripping scheme with transient filter supervision and automatic load restoration is used, no cases result in system-wide blackout and average excess amount of load shed is reduced to only 16.5 MW's.

FIG. 4B illustrates example data in a load tripping table 420 for tripping energy loads with a RoCoF under-frequency tripping scheme. As shown by the table 420, more load can be tripped at level 1 than at levels 2 or 3. For example, up to 25% of load can be tripped at level 1, with a minimum of 10% of load being tripped at this level. At both levels 2 and 3, 10% of load may be tripped. In some implementations, the amount of load tripped at one or more levels can vary depending on the loads, expected frequency of a particular system, etc.

In the illustrative example shown in the table 420, 205 MW of level 1 load was tripped (e.g., 10.25%) when the RoCoF was determined, using the disclosed techniques, to be less than 1.5 Hz/sec (refer to "AND_4" column in the table 420). Also as shown in the table 420, as another example, 205 MW of level 1 load was tripped (10.25%) when the RoCoF was determined to be between 1.5 Hz/sec and 2.5 Hz/sec (refer to "AND 3" column in the table 420). As yet another example, 275 MW of level 1 load was tripped (13.75%) when the RoCoF was determined to be between 2.5 Hz/sec and 3.5 Hz/sec (refer to "AND_2" column in the table 420). Moreover, 475 MW of level 1 load was tripped (23.75%) when the RoCoF was determined to be between 3.5 Hz/sec and 10 Hz/sec (refer to "AND_1" column in the table 420).

Figure 4C:
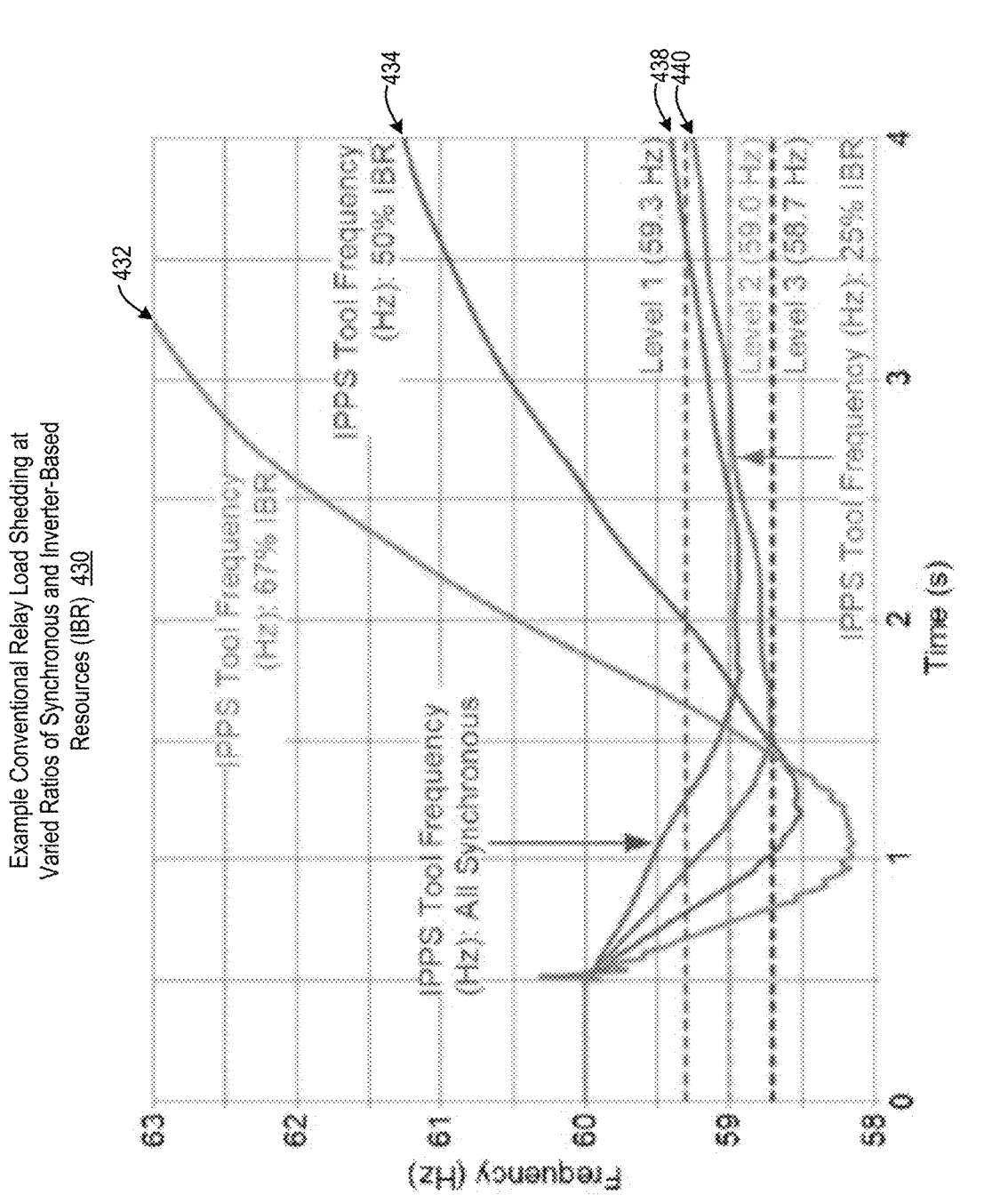
FIG. 4C is a graph showing test results example of conventional relay load shedding in response to under-frequency events at varying ratios of synchronous and inverter-based resources.

FIG. 4C is a graph 430 showing example conventional relay load shedding to respond to under-frequency events at varying ratios of synchronous and inverter-based resources 432-440. Line 432 depicts an example under-frequency event occurring with a proportion of 67% inverter-based energy and 33% synchronous-based energy generation. Line 434 depicts an example under-frequency event occurring with a proportion of 50% inverter-based energy and 50% synchronous-based energy generation. Line 440 depicts an example under-frequency event occurring with a proportion of 25% inverter-based energy and 75% synchronous-based energy generation. Line 438 depicts an example under-frequency event occurring with a proportion of 0% inverter-based energy and 100% synchronous-based energy generation. As shown in these example lines 432-440, the greater the proportion of inverter-based energy during an under-frequency event, the worse the response from the conventional relay to the event.

Figure 4D:
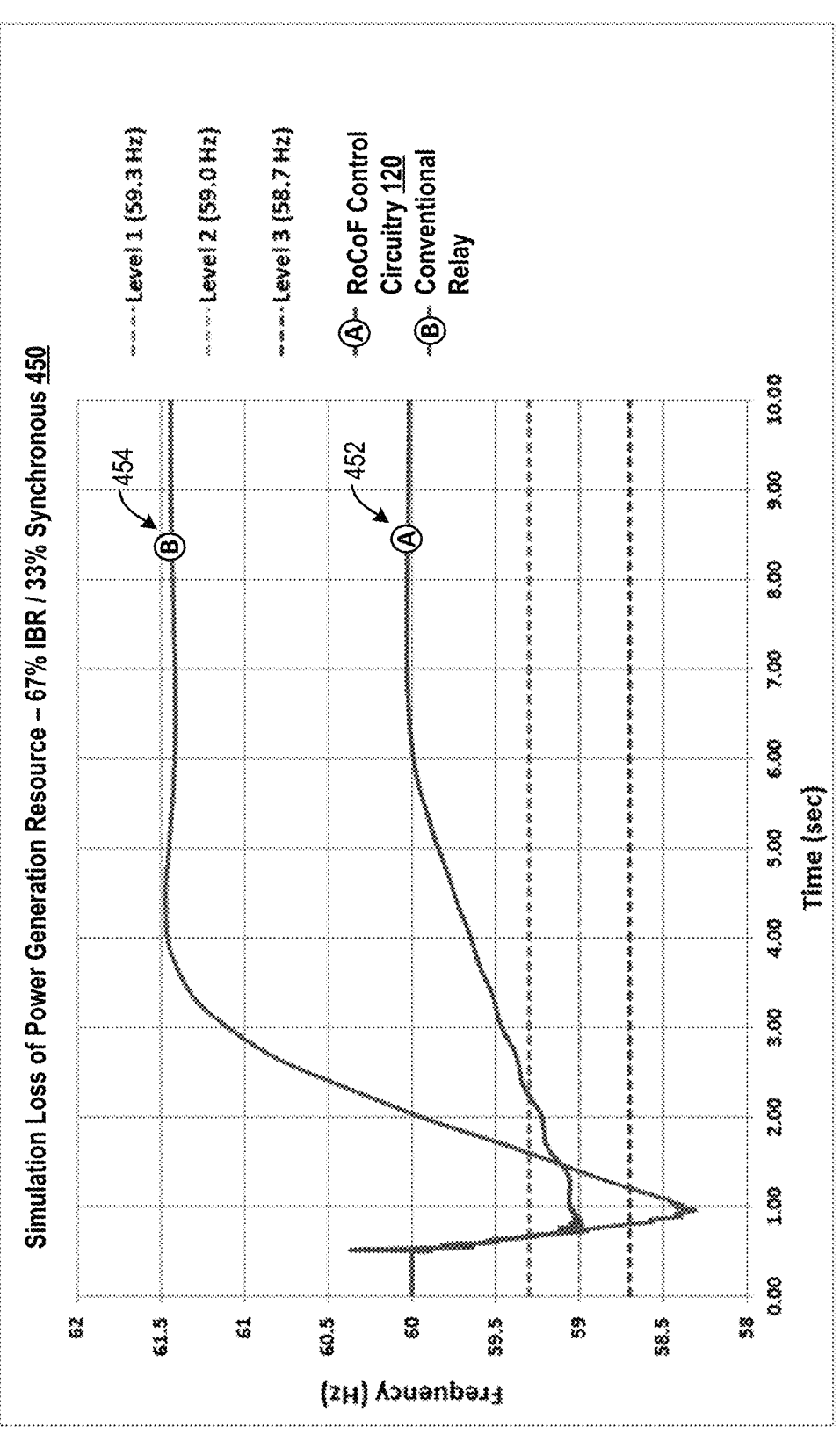
FIG. 4D is a graph showing a test results example comparison of a RoCoF control circuitry and a conventional relay during an under-frequency event.

FIG. 4D is a graph 450 showing an example comparison of a RoCoF control circuitry 452 and a conventional relay 454 during an under-frequency event. In this example, the RoCoF control circuitry 452 is able to more quickly shed an appropriate amount of load to stem the under-frequency event and to regain a target frequency (e.g., 60 Hz), while at the same time avoiding the over-frequency event that can occur with conventional set-point based responses 454 to under-frequency events.

FIGS. 5A-E are example alternative embodiments of a RoCoF control circuitry of a relay. The example circuitry can be implemented in any of the relays described throughout this disclosure. In some implementations, each relay can implement different circuitry described herein or different variations of the circuitry described herein.

Figure 5A:
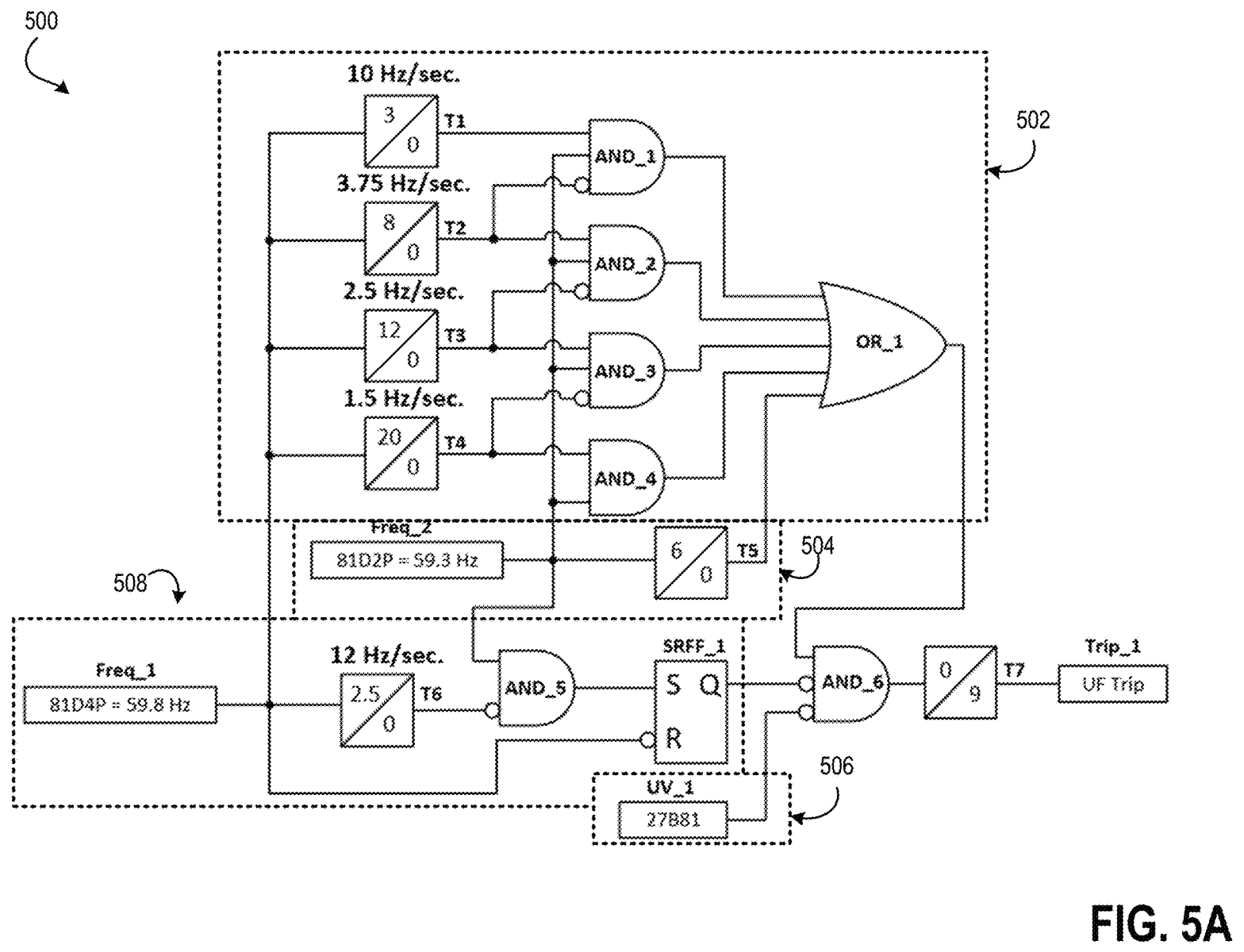

FIG. 5A illustrates example RoCoF control circuitry 500. The circuitry 500 can include a high-speed RoCoF under-frequency trip logic element 502, a relay under-frequency logic element 504, a fast transient filter 508, and a relay under-voltage inhibit logic element 506. Refer to FIG. 3 for further discussion about the components 502, 504, 508, and 506 in FIG. 5A, which correspond to the components 310, 302, 306, and 304, respectively, in FIG. 3.

Using the circuitry 500 of FIG. 5A, load can be tripped at a predetermined under-frequency set point using the high-speed RoCoF under-frequency trip logic element 502 if the RoCoF is determined to be greater than 0 and less than 10 Hz/sec. Using the element 502 can result in no intentional time delay for RoCoF tripping. As a result, tripping can occur in real-time or near real-time (e.g., within miliseconds, within a second, etc.) of determining the RoCoF is greater than 0 and less than 10 Hz/sec. The relay under-frequency logic element 504 can be configured to maintain normal or otherwise typical under-frequency tripping scheme. The fast transient filter 508 can be configured to block tripping if the RoCoF is determined to be greater than 12 Hz/sec. Thus, the filter 508 can be used to block tripping for motor spin-down that may be caused by loss of an energy source. The relay under-voltage inhibit logic element 506 can be configured to maintain the under-voltage inhibit at approximately 67%. The under-voltage inhibit can also be maintained within one or more other ranges and/or values based on the implementation design of the relays described herein.

Figure 5B:
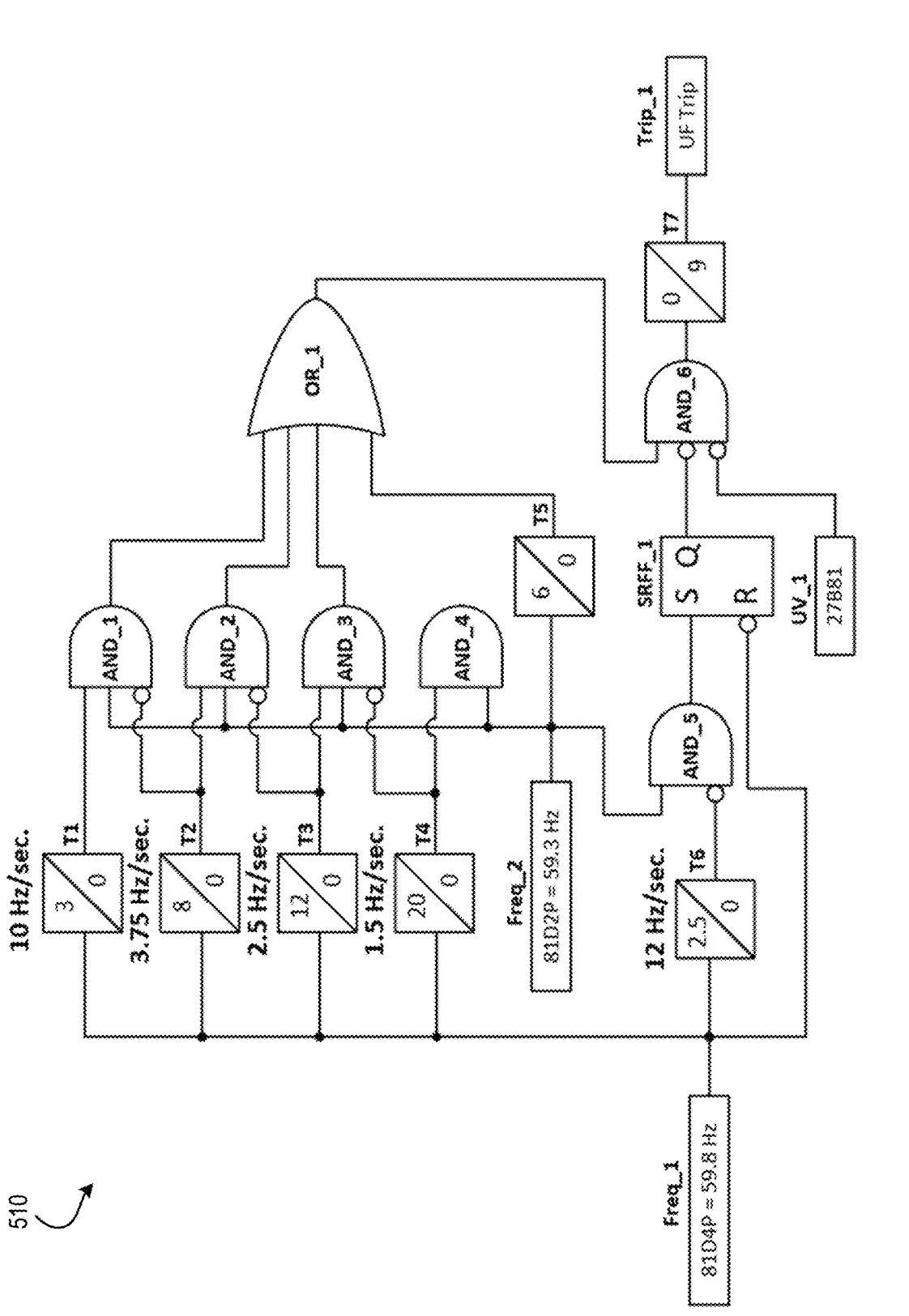

FIG. 5B illustrates example RoCoF control circuitry 510. The circuitry 510 includes one or more of the same components described in reference to the circuitry 500 of FIG. 5A. Unlike the circuitry 500 of FIG. 5A, the circuitry 510 of FIG. 5B can be configured to only trip when the RoCoF is determined to be between 1.5 Hz/sec and 10 Hz/sec.

Figure 5C:
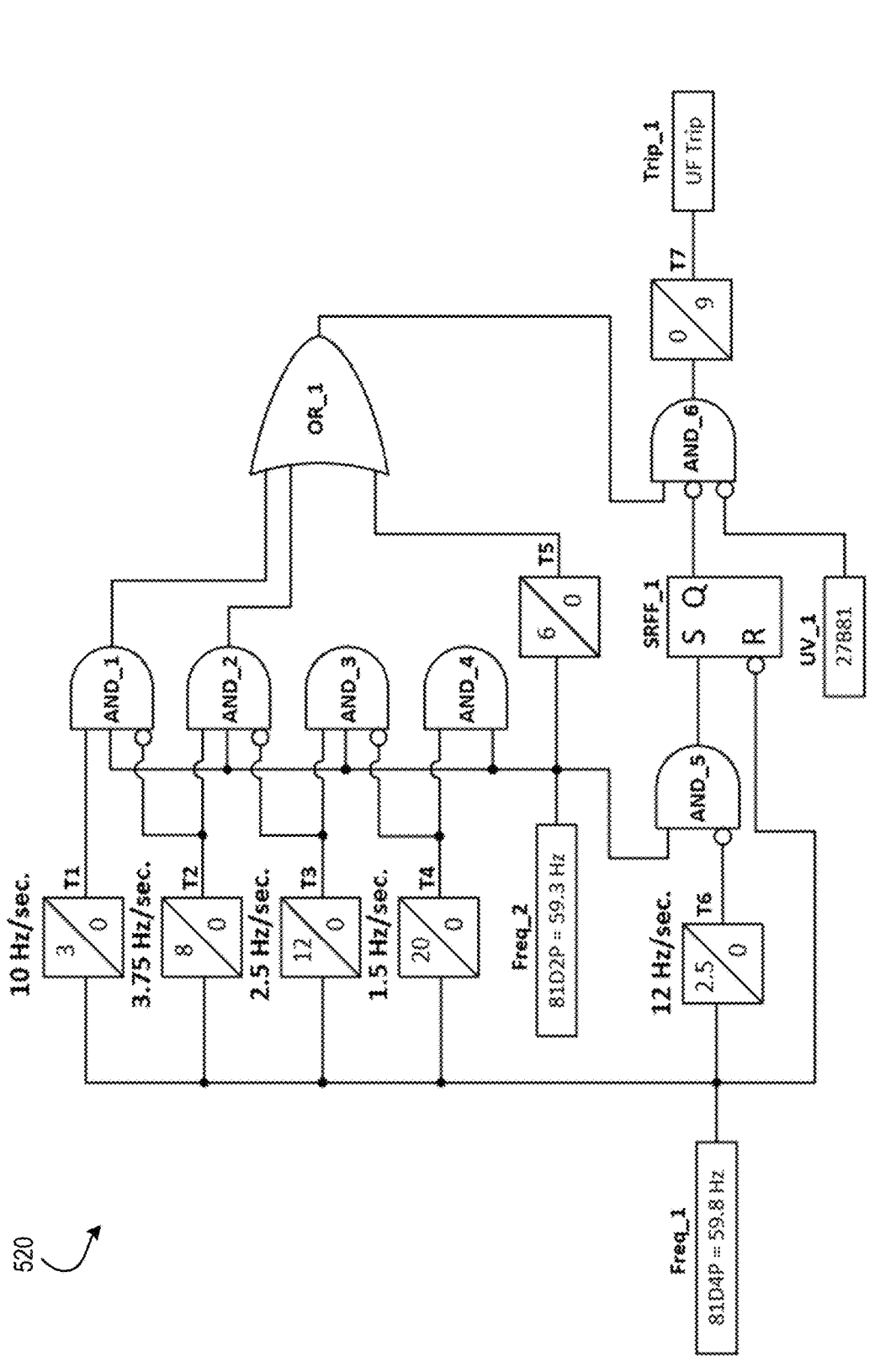

FIG. 5C illustrates example RoCoF control circuitry 520. The circuitry 520 includes one or more of the same components described in reference to the circuitry 500 of FIG. 5A. Unlike the circuitry 500 of FIG. 5A and the circuitry 510 of FIG. 5B, the circuitry 520 of FIG. 5C can be configured to only trip when the RoCoF is determined to be between 2.5 Hz/sec and 10 Hz/sec.

Figure 5D:
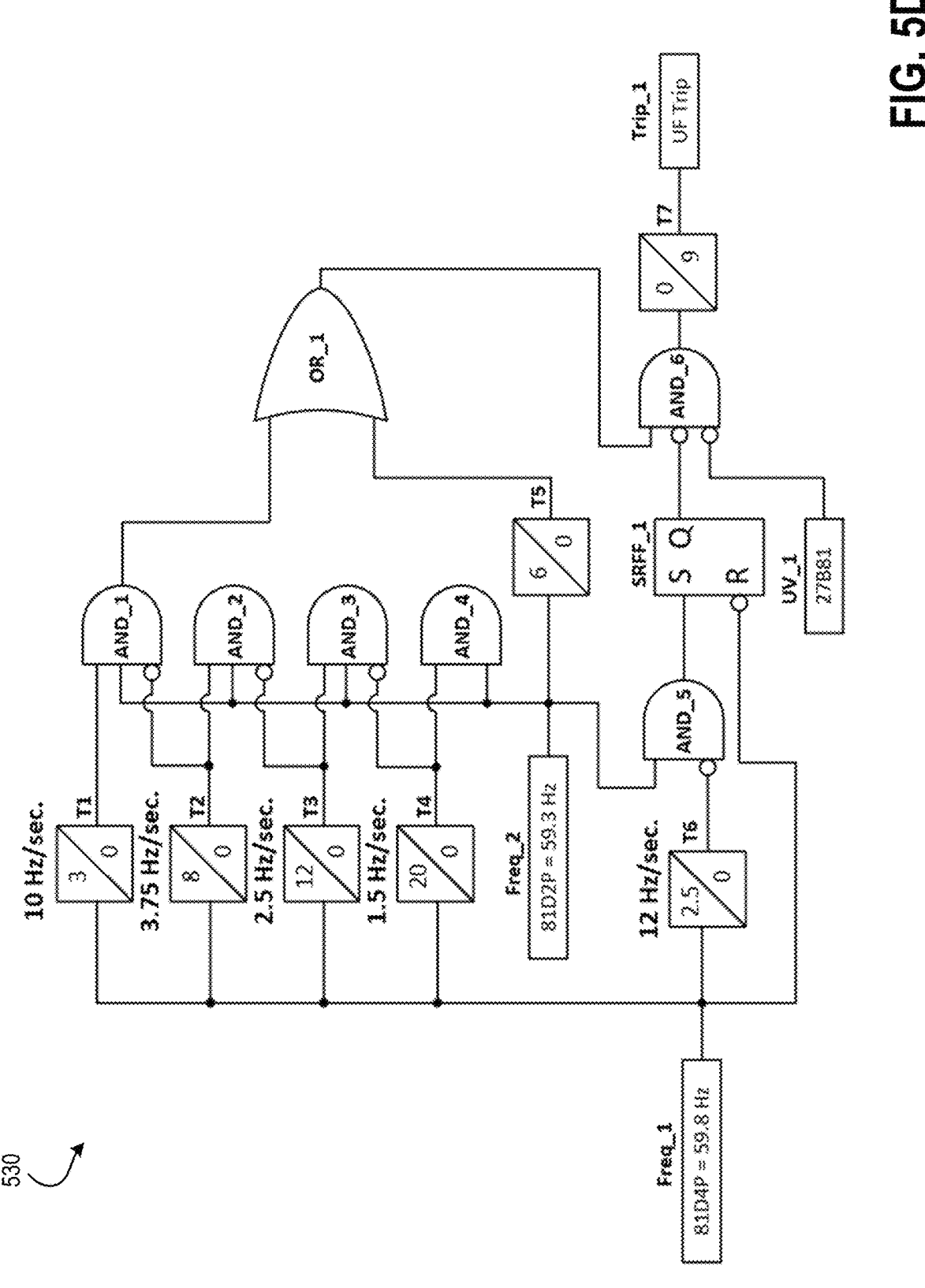

FIG. 5D illustrates example RoCoF control circuitry 530. The circuitry 530 includes one or more of the same components described in reference to the circuitry 500 of FIG. 5A. Unlike the circuitry 500 of FIG. 5A, the circuitry 510 of FIG. 5B, and the circuitry 520 of FIG. 5C, the circuitry 530 of FIG. 5D can be configured to only trip when the RoCoF is determined to be between 3.5 Hz/sec and 10 Hz/sec.

Figure 5E:
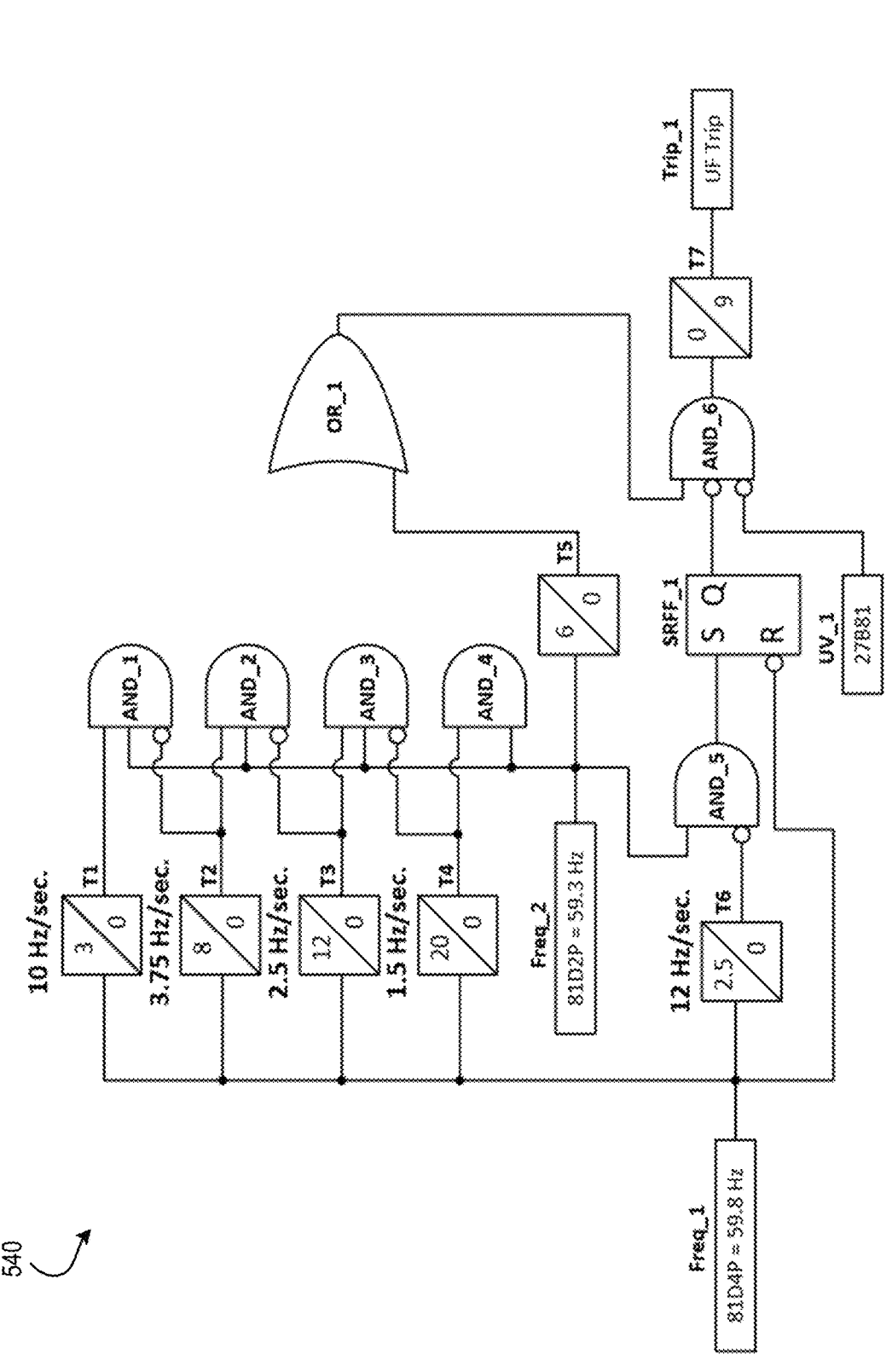

FIG. 5E illustrates example RoCoF control circuitry 540. The circuitry 540 includes one or more of the same components described in reference to the circuitry 500 of FIG. 5A. Unlike the circuitry 500 of FIG. 5A, the circuitry 510 of FIG. 5B, the circuitry 520 of FIG. 5C, or the circuitry 530 of FIG. 5D, the circuitry 540 of FIG. 5E can be configured to only trip per conventional or typical under-frequency tripping schemes.

As described herein, the RoCoF control circuitry can be implemented in a variety of ways described throughout this disclosure. Other variations in implementation and embodiments are also possible.

FIG. 6 is a flowchart of a process 600 for energy load tripping using a RoCoF under-frequency tripping scheme. The process 600 can be performed by any RoCoF control circuitry described throughout this disclosure (e.g., refer to FIGS. 3 and 5A-E). The process 600 can also be performed by one or more other systems, devices, and/or system components. In some implementations, the process 600 can be performed in software implementations, by software platforms that can be deployed at one or more computing systems, computing devices, cloud-based systems, and/or networks of computing systems and/or devices. For illustrative purposes, the process 600 is described from the perspective of a RoCoF control circuitry.

Referring to the process 600, the circuitry can receive substation frequency information in block 602. The information can include frequency information received from transmission lines, sensors, relays, transistors, or other physical components that may be part of a transmission line system for providing energy to various users across an energy grid or other energy network. The information can be received in Hertz (Hz).

The frequency information can be supplied and processed through the RoCoF control circuitry described throughout this document, such as in FIGS. 3 and 5A-E, and if at least a first frequency threshold is met, then a first through nth timers can be set (block 604). As an illustrative example, as described further in reference to FIG. 3, if a frequency of 59.8 Hz (e.g., Freq_1, the first RoCoF conditions), or a frequency within a predetermined range of 59.8 Hz is detected, then the circuitry can determine that a threshold of the first RoCoF conditions is met and 4 timers can be set. The circuitry can also determine in block 604 that an under-frequency event is detected based on the threshold of the conditions existing/being met.

While the first through nth timers are running, the circuitry can determine if the threshold of the conditions are met before the first timer expires, then a first predetermined amount of the energy can be tripped (block 606). As an illustrative example further described in reference to FIG. 3, if the RoCoF is determined to be less than 6 Hz/sec, then the first timer can time out and the circuitry can cause 25% of the energy to be tripped.

Additionally or alternatively, the circuitry can determine if the threshold of the conditions are met before the nth timer expires, then an nth predetermined amount of the energy can be tripped (block 608). As an illustrative example of blocks 606 and 608, the circuitry can trip 10% of load in block 606. Then, if the threshold of the conditions are met before a second timer expires, the circuitry can cause a second predetermined amount in the energy load to be tripped, such as 15%. Moreover, if the threshold of the conditions are met before a third timer expires, the circuitry can cause a third predetermined amount in the energy load to be tripped, such as 20%. If the threshold of the conditions are met before a fourth timer expires (e.g., the nth timer), then the circuitry can cause a fourth predetermined amount in the energy load to be tripped, such as 25%.

In some implementations, the nth predetermined amount of energy that is tripped can be greater than the first predetermined amount of energy that is tripped and/or any predetermined amounts of energy that are tripped between the first and nth timers expiring. Using the disclosed technology can provide for staggered tripping of more and more load as levels of RoCoF increase, thereby allowing for a right amount of load to be tripped to provide more stable frequency recovery for the energy transmission system as a whole. Refer to FIG. 3 for discussion about an illustrative example of the process 600.

The circuitry can perform both blocks 606 and 608 so long as the first through nth timers are still running (or any combination of the first through nth timers are still running).

The circuitry can check whether all of the timers have expired in block 614. The circuitry can continuously perform the check, while performing blocks 610 and/or 612. The circuitry can also perform block 610 at predetermined times, such as after the first timer expires, after a next timer expires, after the circuitry performs block 606 and/or block 608, etc. If all of the timers have not expired, then the circuitry can return to performing blocks 606 and/or 608 until all of the timers expire.

If all of the timers have expired, then the circuitry proceeds to block 612, in which the circuitry can determine whether there are more RoCoF conditions to identify presence of in the received information. For example, the more RoCoF conditions can include one or more other level frequency set points described throughout this disclosure (e.g., refer to Freq_2 and Freq_3 in FIG. 3).

If there are no more RoCoF conditions to identify presence of in the received information, then the process 600 can stop. If there are more RoCoF conditions to identify presence of in the received information, then the circuitry proceeds to block 614, in which the circuitry can identify presence of one or more nth RoCoF conditions in the received information.

The circuitry then proceeds to block 604 and sets first through nth timers based on identifying that at least a predetermined threshold of the nth RoCoF conditions exist in the received information. The circuitry can continue through the process 600 until no more RoCoF conditions identified in the received information.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for tripping energy loads in an energy transmission system based on rate of change of frequency (RoCoF), the method comprising:

receiving, by a control circuitry of a relay, energy-in-generation information for an energy load;

determining, by the control circuitry, a RoCoF for the energy load based on the received energy-in-generation information;

identifying, by the control circuitry, presence of one or more first RoCoF conditions, wherein the one or more first RoCoF conditions include a first predetermined level frequency set point;

setting, by the control circuitry, first through nth timers based on a determination that at least a threshold of the one or more first RoCoF conditions are identified, a predetermined frequency value, and a predetermined number of cycles; and until the first through nth timers expire:

determining, by the control circuitry, whether the threshold of the first RoCoF conditions is met before the first timer expires;

generating, by the control circuitry, instructions that cause tripping the energy load by a first predetermined amount based on a determination that the threshold of the first RoCoF conditions is met before the first timer expires; and returning, by the control circuitry, the instructions for execution by the relay to cause the tripping of the energy load in near real-time.

2. The method of claim 1, wherein the determination that at least the threshold of the one or more first RoCoF conditions are identified is based on identifying a frequency of the energy load in the energy-in-generation information that is within a threshold range of the one or more first RoCoF conditions, wherein the one or more first RoCoF conditions is the first predetermined level frequency set point.

3. The method of claim 2, wherein the first predetermined level frequency set point is 59.8 Hz.

4. The method of claim 1, wherein the determination that at least the threshold of the one or more first RoCoF conditions are identified is based on identifying a RoCoF of the energy load in the energy-in-generation information that is within a first threshold RoCoF range, the first threshold RoCoF range being between 0 Hz/sec and 10 Hz/sec.

5. The method of claim 1, wherein setting, by the control circuitry, first through nth timers comprises setting 4 timers.

6. The method of claim 1, the method further comprising: generating, by the control circuitry, instructions that cause tripping the energy load by an nth predetermined amount based on a determination that the threshold of the first RoCoF conditions is met before the nth timer expires.

7. The method of claim 1, the method further comprising:

determining, by the control circuitry, whether nth RoCoF conditions are identified in the received energy-in-generation information;

identifying, by the control circuitry, presence of one or more of the nth RoCoF conditions; and setting, by the control circuitry, the first through nth timers based on a determination that at least a threshold of the one or more nth RoCoF conditions are identified.

8. The method of claim 7, wherein the nth RoCoF conditions include a second predetermined level frequency set point.

9. The method of claim 8, wherein the second predetermined level frequency set point is 59.3 Hz.

10. A relay apparatus for tripping energy loads in an energy transmission system based on rate of change of frequency (RoCoF), the relay apparatus comprising:

a high-speed RoCoF under-frequency trip logic control circuit configured to generate instructions that cause tripping of an energy load in the energy transmission system without time delay;

a supervised under-frequency trip logic control circuit configured to determine whether to execute the instructions that are generated by the high-speed RoCoF under-frequency trip logic control circuit;

a supervised automatic load restoration logic control circuit configured to determine whether to restore the energy load by a predetermined amount based on execution of the instructions that are generated by the high-speed RoCoF under-frequency trip logic control circuit; and at least one transient filter configured to avoid miss-tripping the energy load based at least in part on the instructions generated by the high-speed RoCoF under-frequency trip logic control circuit and on states of first through nth timers set based on a determination that at least a threshold of one or more first RoCoF conditions are identified, a predetermined frequency value, and a predetermined number of cycles.

11. The relay apparatus of claim 10, wherein the high-speed RoCoF under-frequency trip logic control circuit is configured to:

set at least one timer based on determining that a system frequency of the energy load equals a predetermined level frequency set point; and in response to setting at least one timer, generating the instructions that cause the tripping of the energy load based on a RoCoF of the energy load satisfying one or more tripping conditions.

12. The relay apparatus of claim 10, wherein the high-speed RoCoF under-frequency trip logic control circuit is configured to generate instructions that cause the tripping of the energy load based on determining that a RoCoF of the energy load is between 0 Hz/sec and 6 Hz/sec.

13. The relay apparatus of claim 10, wherein the high-speed RoCoF under-frequency trip logic control circuit is configured to generate instructions that cause the tripping of the energy load by 10% based on determining that the RoCoF of the energy load is less than 1.5 Hz/sec.

14. The relay apparatus of claim 10, wherein the high-speed RoCoF under-frequency trip logic control circuit is configured to generate instructions that cause the tripping of the energy load by 15% based on determining that the RoCoF of the energy load is less than 2.5 Hz/sec.

15. The relay apparatus of claim 10, wherein the high-speed RoCoF under-frequency trip logic control circuit is configured to generate instructions that cause the tripping of the energy load by 20% based on determining that the RoCoF of the energy load is less than 3.75 Hz/sec.

16. The relay apparatus of claim 10, wherein the high-speed RoCoF under-frequency trip logic control circuit is configured to generate instructions that cause the tripping of the energy load by 25% based on determining that the RoCoF of the energy load is less than 6 Hz/sec.

17. The relay apparatus of claim 10, wherein the at least one transient filter comprises a fast transient filter configured to avoid mis-tripping in response to a loss of an energy source to a substation in the energy transmission system, wherein the fast transient filter is configured to detect RoCoF that is greater than 12 Hz/see and is further configured to:

identify that a frequency of the energy load is less than a settable frequency element;

set a timer based on the identification; and identify that the frequency drops to a second settable frequency element while the timer is set;

set a flip-flop state of the relay apparatus based on identifying that the frequency drops to the second settable frequency element while the timer is set; and generate instructions to prevent under-frequency tripping of the energy load.

18. The relay apparatus of claim 17, wherein the at least one transient filter comprises a slow transient filter configured to prevent high-speed RoCoF under-frequency logic from tripping in response to frequency anomalies of one or more energy resources, the one or more energy resources including wind turbines and solar panels, wherein the slow transient filter is configured to detect RoCoF that is greater than 6 Hz/sec and is further configured to:

identify that the frequency of the energy load is less than the settable frequency element;

set a second timer based on the identification; and identify that the frequency drops to a third settable frequency element while the second timer is set;

set the flip-flop state of the relay apparatus based on identifying that the frequency drops to the third settable frequency element while the second timer is set; and generate instructions to prevent high-speed RoCoF under-frequency tripping of the energy load.

19. The relay apparatus of claim 10, further comprising a relay under-frequency logic control circuit including a settable frequency element and a timer, wherein the settable frequency element is set to a predetermined tripping frequency corresponding to the energy transmission system, wherein the relay under-frequency logic control circuit is configured to:

identify that a frequency of the energy load is less than or equal to the settable frequency element;

set the timer based on the identification;

determine whether the frequency remains less than or equal to the settable frequency element for a duration of the timer; and generate instructions to trip the energy load by a predetermined amount based on the determination.

20. The relay apparatus of claim 10, further comprising a relay under-voltage inhibit logic control circuit configured to prevent under-frequency tripping events as a result of loss of an energy source to a substation in the energy transmission system, wherein the relay under-voltage inhibit logic control circuit is configured to:

identify that a frequency of the energy load is less than a predetermined under-voltage pick-up value; and generate instructions to prevent under-frequency tripping of the energy load based on the identification.

21. A relay apparatus for tripping energy loads in an energy transmission system based on rate of change of frequency (RoCoF), the relay apparatus comprising:

a high-speed RoCoF under-frequency trip logic control circuit configured to generate instructions that cause tripping of an energy load in the energy transmission system without time delay;

a supervised under-frequency trip logic control circuit configured to determine whether to execute the instructions that are generated by the high-speed RoCoF under-frequency trip logic control circuit;

a supervised automatic load restoration logic control circuit configured to determine whether to restore the energy load by a predetermined amount based on execution of the instructions that are generated by the high-speed RoCoF under-frequency trip logic control circuit; and at least one transient filter comprising a fast transient filter configured to avoid mis-tripping in response to a loss of an energy source to a substation in the energy transmission system and configured to detect RoCoF that is greater than 12 Hz/sec, and configured to avoid miss-tripping the energy load based at least in part on the instructions generated by the high-speed RoCoF under-frequency trip logic control circuit, wherein the at least one transient filter is further configured to:

identify that a frequency of the energy load is less than a first settable frequency element;

set a timer based on the identification; and identify that the frequency drops to a second settable frequency element while the timer is set;

set a flip-flop state of the relay apparatus based on identifying that the frequency drops to the second settable frequency element while the timer is set; and generate instructions to prevent under-frequency tripping of the energy load.

* * * * *